(12) United States Patent
Zhou et al.

(10) Patent No.: US 12,335,528 B2
(45) Date of Patent: Jun. 17, 2025

(54) VIDEO DECODING APPARATUS AND VIDEO CODING APPARATUS

(71) Applicant: SHARP KABUSHIKI KAISHA, Sakai (JP)

(72) Inventors: Tianyang Zhou, Sakai (JP); Tomohiro Ikai, Sakai (JP); Tomoko Aono, Sakai (JP); Tomonori Hashimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 47 days.

(21) Appl. No.: 18/564,463

(22) PCT Filed: Mar. 24, 2022

(86) PCT No.: PCT/JP2022/013833
§ 371 (c)(1),
(2) Date: Nov. 27, 2023

(87) PCT Pub. No.: WO2022/254899
PCT Pub. Date: Dec. 8, 2022

(65) Prior Publication Data
US 2024/0251105 A1    Jul. 25, 2024

(30) Foreign Application Priority Data

May 31, 2021   (JP) ................. 2021-091071

(51) Int. Cl.
*H04N 19/60* (2014.01)
*H04N 19/119* (2014.01)
*H04N 19/46* (2014.01)

(52) U.S. Cl.
CPC ......... *H04N 19/649* (2014.11); *H04N 19/119* (2014.11); *H04N 19/46* (2014.11)

(58) Field of Classification Search
CPC ..... H04N 19/649; H04N 19/119; H04N 19/46
USPC ...................................... 375/240.18
See application file for complete search history.

(56) References Cited

U.S. PATENT DOCUMENTS

2020/0344486 A1* 10/2020 Huang ................. H04N 19/119
2021/0160494 A1*  5/2021 Yang .................... H04N 19/137

OTHER PUBLICATIONS

ITU-T, "Series H: Audiovisual and Multimedia Systems Infrastructure of audiovisual services—Coding of moving video", H.266, (Aug. 2020).

* cited by examiner

*Primary Examiner* — Allen C Wong
(74) *Attorney, Agent, or Firm* — ScienBiziP, P.C.

(57) ABSTRACT

Video coding and decoding apparatuses (11 and 31) capable of improving coding efficiency are provided. The video decoding apparatus (31) according to an aspect of the present invention is a video decoding apparatus (31) including a prediction unit (30377) that derives a prediction image using a weight parameter derived from an angle variable, and a non-separable transform processing unit (31121) that performs a non-separable transform, in which the non-separable transform processing unit (31121) derives a set number (lfnstTrSetId) of the non-separable transform from split information (merge_gpm_partition_idx) of the GPM in a case that an inter-prediction mode is a GPM mode.

7 Claims, 24 Drawing Sheets

(a)
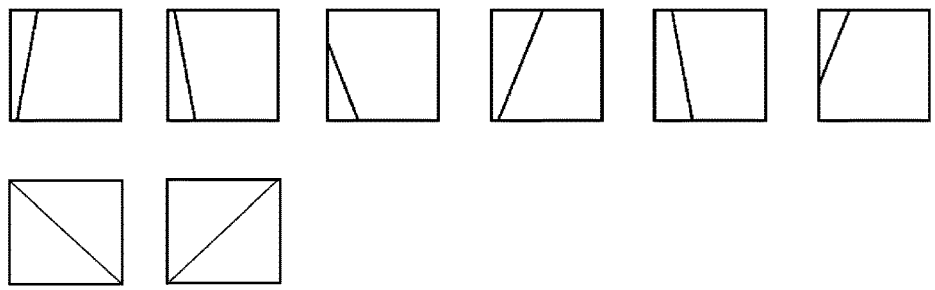
(b)
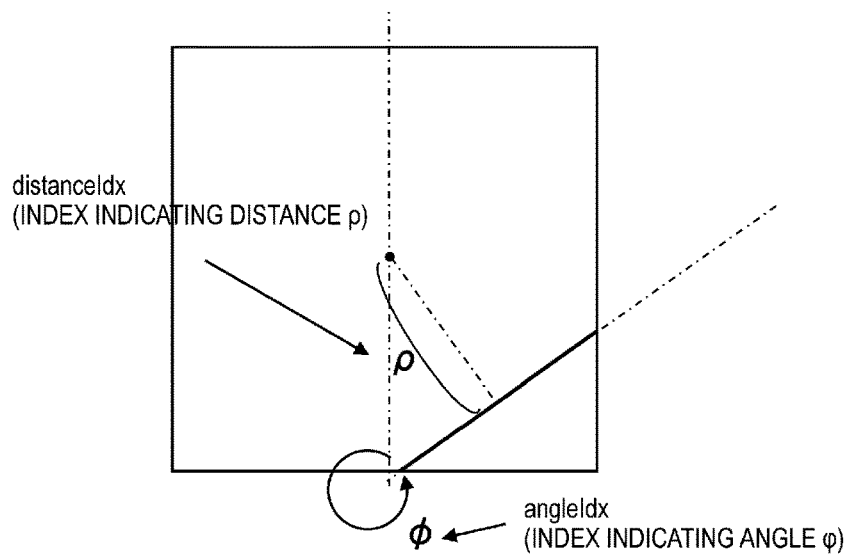
(c)
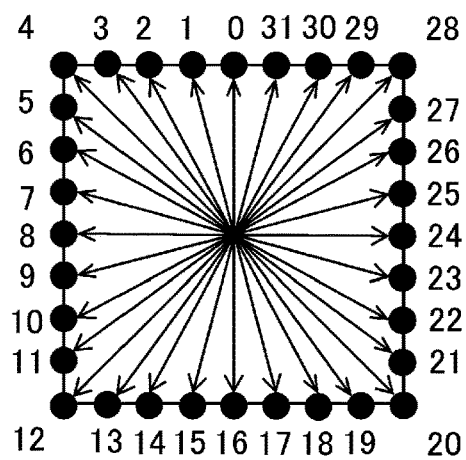
FIG. 9

(a)

| seq_parameter_set_rbsp( ) { | Descriptor |
|---|---|
|   sps_seq_parameter_set_id | u(4) |
|   sps_video_parameter_set_id | u(4) |
|   ... | |
|   sps_bcw_enabled_flag | u(1) |
|   sps_ciip_enabled_flag | u(1) |
|   if( MaxNumMergeCand >= 2 ) { | |
|     sps_gpm_enabled_flag | u(1) |
|     if( sps_gpm_enabled_flag && MaxNumMergeCand >= 3 ) | |
|       sps_max_num_merge_cand_minus_max_num_gpm_cand | ue(v) |
|   } | |
|   ... | |
| } | |

(b)

| merge_data( x0, y0, cbWidth, cbHeight, chType ) { | Descriptor |
|---|---|
|   if ( CuPredMode[ chType ][ x0 ][ y0 ] = = MODE_IBC ) { | |
|     ... | |
|   } else { /* MODE_INTER */ | |
|     if( MaxNumSubblockMergeCand > 0 && cbWidth >= 8 && cbHeight >= 8) | |
|       merge_subblock_flag[ x0 ][ y0 ] | ae(v) |
|     if( merge_subblock_flag[ x0 ][ y0 ] = = 1 ) { | |
|       ... | |
|     } else { | |
|       if( cbWidth < 128 && cbHeight < 128 && <br>         ( ( sps_ciip_enabled_flag && cu_skip_flag[ x0 ][ y0 ] = = 0 && <br>           ( cbWidth * cbHeight ) >= 64 ) || <br>         ( sps_gpm_enabled_flag && <br>           sh_slice_type = = B && cbWidth >= 8 && cbHeight >= 8 && <br>           cbWidth < ( 8 * cbHeight ) && cbHeight < ( 8 * cbWidth ) ) ) ) | |
|         regular_merge_flag[ x0 ][ y0 ] | ae(v) |
|       if ( regular_merge_flag[ x0 ][ y0 ] = = 1 ){ | |
|         ... | |
|       } else { | |
|         if( sps_ciip_enabled_flag && sps_gpm_enabled_flag && <br>           sh_slice_type = = B && <br>           cu_skip_flag[ x0 ][ y0 ] = = 0 && cbWidth >= 8 && cbHeight >= 8 && <br>           cbWidth < ( 8 * cbHeight ) && cbHeight < ( 8 * cbWidth ) && <br>           cbWidth < 128 && cbHeight < 128 ) | |
|           ciip_flag[ x0 ][ y0 ] | ae(v) |
|         ... | |
|         if( !ciip_flag[ x0 ][ y0 ] ) { | |
|           merge_gpm_partition_idx[ x0 ][ y0 ] | ae(v) |
|           merge_gpm_idx0[ x0 ][ y0 ] | ae(v) |
|           if( MaxNumGpmMergeCand > 2 ) | |
|             merge_gpm_idx1[ x0 ][ y0 ] | ae(v) |
|         ... | |
|   } | |

FIG. 10

| merge_gpm_partition_idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| angleIdx | 0 | 0 | 2 | 2 | 2 | 2 | 3 | 3 | 3 | 3 | 4 | 4 | 4 | 4 | 5 | 5 |
| distanceIdx | 1 | 3 | 0 | 1 | 2 | 3 | 0 | 1 | 2 | 3 | 0 | 1 | 2 | 3 | 0 | 1 |
| merge_gpm_partition_idx | 16 | 17 | 18 | 19 | 20 | 21 | 22 | 23 | 24 | 25 | 26 | 27 | 28 | 29 | 30 | 31 |
| angleIdx | 5 | 5 | 8 | 8 | 11 | 11 | 11 | 11 | 12 | 12 | 12 | 12 | 13 | 13 | 13 | 13 |
| distanceIdx | 2 | 3 | 1 | 3 | 0 | 1 | 2 | 3 | 0 | 1 | 2 | 3 | 0 | 1 | 2 | 3 |
| merge_gpm_partition_idx | 32 | 33 | 34 | 35 | 36 | 37 | 38 | 39 | 40 | 41 | 42 | 43 | 44 | 45 | 46 | 47 |
| angleIdx | 14 | 14 | 14 | 14 | 16 | 16 | 18 | 18 | 18 | 19 | 19 | 19 | 20 | 20 | 20 | 21 |
| distanceIdx | 0 | 1 | 2 | 3 | 1 | 3 | 1 | 2 | 3 | 1 | 2 | 3 | 1 | 2 | 3 | 1 |
| merge_gpm_partition_idx | 48 | 49 | 50 | 51 | 52 | 53 | 54 | 55 | 56 | 57 | 58 | 59 | 60 | 61 | 62 | 63 |
| angleIdx | 21 | 21 | 24 | 24 | 27 | 27 | 27 | 28 | 28 | 28 | 29 | 29 | 29 | 30 | 30 | 30 |
| distanceIdx | 2 | 3 | 1 | 3 | 1 | 2 | 3 | 1 | 2 | 3 | 1 | 2 | 3 | 1 | 2 | 3 |

FIG. 11

| idx | 0 | 2 | 3 | 4 | 5 | 6 | 8 | 10 | 11 | 12 | 13 | 14 |
|---|---|---|---|---|---|---|---|---|---|---|---|---|
| disLut[idx] | 8 | 8 | 8 | 4 | 4 | 2 | 0 | −2 | −4 | −4 | −8 | −8 |
| idx | 16 | 18 | 19 | 20 | 21 | 22 | 24 | 26 | 27 | 28 | 29 | 30 |
| disLut[idx] | −8 | −8 | −8 | −4 | −4 | −2 | 0 | 2 | 4 | 4 | 8 | 8 |

FIG. 12

| predModeIntra | lfnstTrSetIdx |
|---|---|
| predModeIntra < 0 | 1 |
| 0 <= predModeIntra <= 1 | 0 |
| 2 <= predModeIntra <= 12 | 1 |
| 13 <= predModeIntra <= 23 | 2 |
| 24 <= predModeIntra <= 44 | 3 |
| 45 <= predModeIntra <= 55 | 2 |
| 56 <= predModeIntra <= 80 | 1 |

FIG. 14

| angleIdx | lfnstTrSetIdx |
|---|---|
| 0 <= angleIdx <= 1 | 2 |
| 2 <= angleIdx<= 6 | 3 |
| 7 <= angleIdx<= 9 | 2 |
| 10 <= angleIdx<= 14 | 1 |
| 15 <= angleIdx<= 17 | 2 |
| 18 <= angleIdx<= 22 | 3 |
| 23 <= angleIdx<= 25 | 2 |
| 26 <= angleIdx<= 30 | 1 |
| angleIdx == 31 | 2 | nstSetTableGPMangle1

| angleIdx | lfnstTrSetIdx | angleIdx | lfnstTrSetIdx |
|---|---|---|---|
| 0 | 2 | 16 | 2 |
| 1 | 2 | 17 | 2 |
| 2 | 3 | 18 | 3 |
| 3 | 3 | 19 | 3 |
| 4 | 3 | 20 | 3 |
| 5 | 3 | 21 | 3 |
| 6 | 3 | 22 | 3 |
| 7 | 2 | 23 | 2 |
| 8 | 2 | 24 | 2 |
| 9 | 2 | 25 | 2 |
| 10 | 1 | 26 | 1 |
| 11 | 1 | 27 | 1 |
| 12 | 1 | 28 | 1 |
| 13 | 1 | 29 | 1 |
| 14 | 1 | 30 | 1 |
| 15 | 2 | 31 | 2 |

FIG. 15 nstSetTableGPMangle2         nstSetTableGPMangle3

| angleIdx | lfnstTrSetIdx | angleIdx | lfnstTrSetIdx | | angleIdx | lfnstTrSetIdx | angleIdx | lfnstTrSetIdx |
|---|---|---|---|---|---|---|---|---|
| 0 | 0 | 16 | 0 | | 0 | 0 | 16 | 0 |
| 1 | 0 | 17 | 0 | | 1 | 0 | 17 | 0 |
| 2 | 0 | 18 | 0 | | 2 | 1 | 18 | 1 |
| 3 | 0 | 19 | 0 | | 3 | 1 | 19 | 1 |
| 4 | 1 | 20 | 1 | | 4 | 2 | 20 | 2 |
| 5 | 1 | 21 | 1 | | 5 | 2 | 21 | 2 |
| 6 | 1 | 22 | 1 | | 6 | 3 | 22 | 3 |
| 7 | 1 | 23 | 1 | | 7 | 3 | 23 | 3 |
| 8 | 0 | 24 | 0 | | 8 | 0 | 24 | 0 |
| 9 | 0 | 25 | 0 | | 9 | 0 | 25 | 0 |
| 10 | 0 | 26 | 0 | | 10 | 1 | 26 | 1 |
| 11 | 0 | 27 | 0 | | 11 | 1 | 27 | 1 |
| 12 | 1 | 28 | 1 | | 12 | 2 | 28 | 2 |
| 13 | 1 | 29 | 1 | | 13 | 2 | 29 | 2 |
| 14 | 1 | 30 | 1 | | 14 | 3 | 30 | 3 |
| 15 | 1 | 31 | 1 | | 15 | 3 | 31 | 3 |

FIG. 16 nstSetTableGPMangle4        nstSetTableGPMangle5

| angleIdx | lfnstTrSetIdx | angleIdx | lfnstTrSetIdx |
|---|---|---|---|
| 0 | 0 | 16 | 0 |
| 1 | 0 | 17 | 0 |
| 2 | 0 | 18 | 0 |
| 3 | 0 | 19 | 0 |
| 4 | 1 | 20 | 1 |
| 5 | 1 | 21 | 1 |
| 6 | 1 | 22 | 1 |
| 7 | 1 | 23 | 1 |
| 8 | 2 | 24 | 2 |
| 9 | 2 | 25 | 2 |
| 10 | 2 | 26 | 2 |
| 11 | 2 | 27 | 2 |
| 12 | 3 | 28 | 3 |
| 13 | 3 | 29 | 3 |
| 14 | 3 | 30 | 3 |
| 15 | 3 | 31 | 3 |

| angleIdx | lfnstTrSetIdx | angleIdx | lfnstTrSetIdx |
|---|---|---|---|
| 0 | 0 | 16 | 0 |
| 1 | 0 | 17 | 0 |
| 2 | 1 | 18 | 1 |
| 3 | 1 | 19 | 1 |
| 4 | 2 | 20 | 2 |
| 5 | 2 | 21 | 2 |
| 6 | 3 | 22 | 3 |
| 7 | 3 | 23 | 3 |
| 8 | 4 | 24 | 4 |
| 9 | 4 | 25 | 4 |
| 10 | 5 | 26 | 5 |
| 11 | 5 | 27 | 5 |
| 12 | 6 | 28 | 6 |
| 13 | 6 | 29 | 6 |
| 14 | 7 | 30 | 7 |
| 15 | 7 | 31 | 7 |

FIG. 17

| angleIdx | lfnstTrSetIdx |
|---|---|
| 0 <= angleIdx <= 1 | 5 |
| 2 <= angleIdx <= 6 | 6 |
| 7 <= angleIdx <= 9 | 5 |
| 10 <= angleIdx <= 14 | 4 |
| 15 <= angleIdx <= 17 | 5 |
| 18 <= angleIdx <= 22 | 6 |
| 23 <= angleIdx <= 25 | 5 |
| 26 <= angleIdx <= 30 | 4 |
| angleIdx == 31 | 5 | nstSetTableGPMangleS

| angleIdx | lfnstTrSetIdx | angleIdx | lfnstTrSetIdx |
|---|---|---|---|
| 0 | 5 | 16 | 5 |
| 1 | 5 | 17 | 6 |
| 2 | 6 | 18 | 6 |
| 3 | 6 | 19 | 6 |
| 4 | 6 | 20 | 6 |
| 5 | 6 | 21 | 6 |
| 6 | 6 | 22 | 6 |
| 7 | 5 | 23 | 5 |
| 8 | 5 | 24 | 5 |
| 9 | 5 | 25 | 5 |
| 10 | 4 | 26 | 4 |
| 11 | 4 | 27 | 4 |
| 12 | 4 | 28 | 4 |
| 13 | 4 | 29 | 4 |
| 14 | 5 | 30 | 5 |
| 15 | 5 | 31 | 5 |

FIG. 18

| merge_gpm_partition_idx | lfnstTrSetIdx |
|---|---|
| 0 <= merge_gpm_partition_idx <= 1 | 2 |
| 2 <= merge_gpm_partition_idx <= 17 | 3 |
| 18 <= merge_gpm_partition_idx <= 19 | 2 |
| 20 <= merge_gpm_partition_idx <= 31 | 1 |
| 32 <= merge_gpm_partition_idx <= 37 | 2 |
| 38 <= merge_gpm_partition_idx <= 49 | 3 |
| 50 <= merge_gpm_partition_idx <= 51 | 2 |
| 52 <= merge_gpm_partition_idx <= 60 | 1 |
| 61 <= merge_gpm_partition_idx <= 63 | 2 | nstSetTableGPMpart

| merge_gpm_partition_idx | (angleIdx) | lfnstTrSetIdx | merge_gpm_partition_idx | (angleIdx) | lfnstTrSetIdx |
|---|---|---|---|---|---|
| 0 | 0 | 2 | 16 | 5 | 3 |
| 1 | 0 | 2 | 17 | 5 | 3 |
| 2 | 2 | 3 | 18 | 8 | 2 |
| 3 | 2 | 3 | 19 | 8 | 2 |
| 4 | 2 | 3 | 20 | 11 | 1 |
| 5 | 2 | 3 | 21 | 11 | 1 |
| 6 | 3 | 3 | 22 | 11 | 1 |
| 7 | 3 | 3 | 23 | 11 | 1 |
| 8 | 3 | 3 | 24 | 12 | 1 |
| 9 | 3 | 3 | 25 | 12 | 1 |
| 10 | 4 | 3 | 26 | 12 | 1 |
| 11 | 4 | 3 | 27 | 12 | 1 |
| 12 | 4 | 3 | 28 | 13 | 1 |
| 13 | 4 | 3 | 29 | 13 | 1 |
| 14 | 5 | 3 | 30 | 13 | 1 |
| 15 | 5 | 3 | 31 | 13 | 1 |

FIG. 19

| seq_parameter_set_rbsp( ) { | Descriptor |
|---|---|
| ... | |
|    sps_gpm_enabled_flag | u(1) |
|    if( sps_gpm_enabled_flag && MaxNumMergeCand >= 3 ) | |
|       sps_max_num_merge_cand_minus_max_num_gpm_cand | ue(v) |
|    } | |
|    if( sps_gpm_enabled_flag && sps_lfnst_enabled_flag ) { | |
|       sps_gpm_lfnst_enabled_flag | u(1) |
|    } | |
|    sps_log2_parallel_merge_level_minus2 | ue(v) |
|    sps_isp_enabled_flag | u(1) |

FIG. 21

| | Descriptor |
|---|---|
| coding_unit( x0, y0, cbWidth, cbHeight, cqtDepth, treeType, modeType ) { | |
|   if( CuPredMode[ chType ][ x0 ][ y0 ] != MODE_INTRA && !pred_mode_plt_flag && <br>    general_merge_flag[ x0 ][ y0 ] == 0 ) | |
|     cu_coded_flag | ae(v) |
|   if( cu_coded_flag ) { | |
|     if( CuPredMode[ chType ][ x0 ][ y0 ] == MODE_INTER && sps_sbt_enabled_flag && <br>      !ciip_flag[ x0 ][ y0 ] && cbWidth <= MaxTbSizeY && cbHeight <= MaxTbSizeY ) { | |
|     LfnstDcOnly = 1 | |
|     LfnstZeroOutSigCoeffFlag = 1 | |
|     MtsDcOnly = 1 | |
|     MtsZeroOutSigCoeffFlag = 1 | |
|     transform_tree( x0, y0, cbWidth, cbHeight, treeType, chType ) | |
|     lfnstWidth = ( treeType == DUAL_TREE_CHROMA ) ? cbWidth / SubWidthC : <br>      ( ( IntraSubPartitionsSplitType == ISP_VER_SPLIT ) ? <br>      cbWidth / NumIntraSubPartitions : cbWidth ) | |
|     lfnstHeight = ( treeType == DUAL_TREE_CHROMA ) ? cbHeight / SubHeightC : <br>      ( ( IntraSubPartitionsSplitType == ISP_HOR_SPLIT ) ? <br>      cbHeight / NumIntraSubPartitions : cbHeight ) | |
|     lfnstNotTsFlag = ( treeType == DUAL_TREE_CHROMA \|\| <br>      !tu_y_coded_flag[ x0 ][ y0 ] \|\| transform_skip_flag[ x0 ][ y0 ][ 0 ] == 0 ) && <br>      ( treeType == DUAL_TREE_LUMA \|\| <br>      ( ( !tu_cb_coded_flag[ x0 ][ y0 ] \|\| <br>      transform_skip_flag[ x0 ][ y0 ][ 1 ] == 0 ) && <br>      ( !tu_cr_coded_flag[ x0 ][ y0 ] \|\| transform_skip_flag[ x0 ][ y0 ][ 2 ] == 0 ) ) ) | |
|     if( Min( lfnstWidth, lfnstHeight ) >= 4 && <br>((sps_lfnst_enabled_flag == 1 && CuPredMode[ chType ][ x0 ][ y0 ] == MODE_INTRA) \|\|  ← SYN_INTRA_LFNST <br>(sps_gpm_lfnst_enabled_flag == 1 && CuPredMode[ chType ][ x0 ][ y0 ] == MODE_INTER ))  ← SYN_GPM_LFNST <br>&& lfnstNotTsFlag == 1 && <br>    ( treeType == DUAL_TREE_CHROMA \|\| !intra_mip_flag[ x0 ][ y0 ] \|\| <br>    Min( lfnstWidth, lfnstHeight ) >= 16 ) && Max( cbWidth, cbHeight ) <= MaxTbSizeY) | |
|       if( ( IntraSubPartitionsSplitType != ISP_NO_SPLIT \|\| LfnstDcOnly == 0 ) && <br>      LfnstZeroOutSigCoeffFlag == 1 ) | |
|         lfnst_idx | ae(v) |
|     } | |
|     if( treeType != DUAL_TREE_CHROMA && lfnst_idx == 0 && <br>      transform_skip_flag[ x0 ][ y0 ][ 0 ] == 0 && Max( cbWidth, cbHeight ) <= 32 && <br>      IntraSubPartitionsSplitType == ISP_NO_SPLIT && cu_sbt_flag == 0 && <br>      MtsZeroOutSigCoeffFlag == 1 && MtsDcOnly == 0 ) { | |
|       if( ( ( CuPredMode[ chType ][ x0 ][ y0 ] == MODE_INTER && <br>      sps_explicit_mts_inter_enabled_flag ) \|\| <br>      ( CuPredMode[ chType ][ x0 ][ y0 ] == MODE_INTRA && <br>      sps_explicit_mts_intra_enabled_flag ) ) ) | |
|         mts_idx | ae(v) |
|     } | |
|   } | |
| } | |

FIG. 22

| | Descriptor |
|---|---|
| transform_unit( x0, y0, tbWidth, tbHeight, treeType, subTuIndex, chType ) { | |
|   if( IntraSubPartitionsSplitType != ISP_NO_SPLIT && <br>     treeType == SINGLE_TREE && subTuIndex == NumIntraSubPartitions − 1 ) { | |
|   ... | |
|   if( tu_y_coded_flag[ x0 ][ y0 ] && treeType != DUAL_TREE_CHROMA ) { | |
|     if( sps_transform_skip_enabled_flag && !BdpcmFlag[ x0 ][ y0 ][ 0 ] && tbWidth <= MaxTsSize && tbHeight <= MaxTsSize && ( IntraSubPartitionsSplitType == ISP_NO_SPLIT ) && !cu_sbt_flag ) | |
|     transform_skip_flag[ x0 ][ y0 ][ 0 ] | ae(v) |
|     if( !transform_skip_flag[ x0 ][ y0 ][ 0 ] || slice_ts_residual_coding_disabled_flag ) | |
|       residual_coding( x0, y0, Log2( tbWidth ), Log2( tbHeight ), 0 ) | |
|     else | |
|       residual_ts_coding( x0, y0, Log2( tbWidth ), Log2( tbHeight ), 0 ) | |
|   } | |
|   lfnstWidth = tbWidth | |
|   lfnstHeight = tbHeight | |
|   if(treeType != DUAL_TREE_CHROMA ) { | |
|     if( Min( lfnstWidth, lfnstHeight ) >= 4 &&  ← SYN_INTRA_LFNST <br> ((sps_lfnst_enabled_flag == 1 && CuPredMode[ chType ][ x0 ][ y0 ] == MODE_INTRA ) \|\| <br> sps_gpm_lfnst_enabled_flag == 1 && CuPredMode[ chType ][ x0 ][ y0 ] == <br> MODE_INTER ) )&&  ← SYN_GPM_LFNST <br>       transform_skip_flag[ x0 ][ y0 ][ 0 ] == 0 && <br>       ( !intra_mip_flag[ x0 ][ y0 ] \|\| <br>       Min( lfnstWidth, lfnstHeight ) >= 16 ) && <br>       Max(CbWidth[ chType ][ x0 ][ y0 ], CbHeight[ chType ][ x0 ][ y0 ] ) <= <br> MaxTbSizeY) && (IntraSubPartitionsSplitType == ISP_NO_SPLIT \|\| ISPTuFlag == 0) { | |
|       if( ( IntraSubPartitionsSplitType != ISP_NO_SPLIT \|\| LfnstDcOnly == 0 ) && <br>       LfnstZeroOutSigCoeffFlag == 1 ) | |
|       lfnst_idx | ae(v) |
|     } | |
|   if( lfnst_idx == 0 && <br>     transform_skip_flag[ x0 ][ y0 ][ 0 ] == 0 && <br>     Max(CbWidth[ chType ][ x0 ][ y0 ], CbHeight[ chType ][ x0 ][ y0 ]) <= 32 && <br>     IntraSubPartitionsSplitType == ISP_NO_SPLIT && cu_sbt_flag == 0 && <br>     MtsZeroOutSigCoeffFlag == 1 && MtsDcOnly == 0 ) { | |
|     if( ( CuPredMode[ chType ][ x0 ][ y0 ] == MODE_INTER && <br> sps_explicit_mts_inter_enabled_flag ) \|\| <br>     ( CuPredMode[ chType ][ x0 ][ y0 ] == MODE_INTRA && <br> sps_explicit_mts_intra_enabled_flag ) ) | |
|     mts_idx | ae(v) |
|     } | |
|   } | |
|   ... | |
| } | |

FIG. 23

VIDEO DECODING APPARATUS AND VIDEO CODING APPARATUS

TECHNICAL FIELD

The embodiment of the present invention relates to a video decoding apparatus and a video coding apparatus.

BACKGROUND ART

A video coding apparatus which generates coded data by coding a video, and a video decoding apparatus which generates decoded images by decoding the coded data are used for efficient transmission or recording of videos.

Specific video coding schemes include, for example, H.264/AVC and High-Efficiency Video Coding (HEVC), and the like.

In such a video coding scheme, images (pictures) constituting a video are managed in a hierarchical structure including slices obtained by splitting an image, Coding Tree Units (CTUs) obtained by splitting a slice, units of coding (which may also be referred to as Coding Units (CUs)) obtained by splitting a coding tree unit, and Transform Units (TUs) obtained by splitting a coding unit, and are coded/decoded for each CU.

In such a video coding scheme, usually, a prediction image is generated based on a local decoded image that is obtained by coding/decoding an input image (a source image), and prediction errors (which may be referred to also as "difference images" or "residual images") obtained by subtracting the prediction image from the input image are coded. Generation methods of prediction images include an inter-picture prediction (inter-prediction) and an intra-picture prediction (intra-prediction).

In addition, NPL 1 discloses a Geometric partition mode (GPM) mode in which a target block is divided in a shape other than rectangles and different inter-prediction is performed for each region. By dividing a target block in a shape other than rectangles in this way, even a complex texture can be predicted more accurately, and coding efficiency is improved. In addition, NPL 1 discloses an image encoding apparatus that performs a non-separable transform for each transform unit in order to further concentrate coefficients obtained by performing a separable transform on prediction errors in a low frequency region.

CITATION LIST

Non Patent Literature

[NPL 1]
ITU-T Rec. H.266

SUMMARY OF INVENTION

Technical Problem

In NPL 1, the non-separable transform and inverse non-separable transform techniques that are effective for directional prediction residuals are applied only to intra-prediction blocks and are not adapted to inter-prediction blocks in which many diagonal directions are present.

An object of the present invention is to provide a video decoding apparatus, a video coding apparatus, and techniques related thereto capable of more preferably applying an inverse non-separable transform.

Solution to Problem

In order to solve the above-described problem, a video decoding apparatus according to an aspect of the present invention is a video decoding apparatus including a prediction unit that derives a prediction image using a weight parameter derived from an angle variable, and a non-separable transform processing unit that performs a non-separable transform. The separable transform processing unit derives a set number (lfnstTrSetId) of the non-separable transform from split information (merge_gpm_partition_idx) of the GPM in a case that an inter-prediction mode is a GPM mode.

A video coding apparatus according to an aspect of the present invention is a video coding apparatus including a prediction unit that derives a prediction image using a weight parameter derived from an angle variable, and a non-separable transform processing unit that performs a non-separable transform. The separable transform processing unit derives a set number (lfnstTrSetId) of the non-separable transform from split information (merge_gpm_partition_idx) of the GPM in a case that an inter-prediction mode is a GPM mode.

Advantageous Effects of Invention

According to one aspect of the present invention, coding efficiency can be improved in video coding/decoding processing.

BRIEF DESCRIPTION OF DRAWINGS

FIG. 9 is a diagram for describing GPM.

FIG. 10 is a syntax diagram for describing coding parameters for GPM prediction.

FIG. 11 is a diagram illustrating a structure of a table showing the correspondence between merge_gpm_partition_idx and angleIdx and distanceIdx in GPM prediction.

FIG. 12 is a diagram illustrating the structure of a table showing the correspondence between idx and DisLut [idx] used in weighting factor derivation processing and motion vector storage processing in GPM prediction.

FIG. 14 is a table used to select a transformation matrix of non-separable transform in an intra-prediction mode.

FIG. 15 is a table used to select a transformation matrix for a non-separable transform in the GPM mode.

FIG. 16 is a table used to select a transformation matrix for a non-separable transform in the GPM mode.

FIG. 17 is a table used to select a transformation matrix for a non-separable transform in the GPM mode.

FIG. 18 is a table used to select a transformation matrix for a non-separable transform in the GPM mode.

FIG. 19 is a table used to select a transformation matrix for a non-separable transform in the GPM mode.

FIG. 21 is an example of a syntax table showing coding parameters for a GPM non-separable transform.

FIG. 22 is an example of a syntax table showing flags of a non-separable transform.

FIG. 23 is an example of a syntax table showing flags of a non-separable transform.

DESCRIPTION OF EMBODIMENTS

First Embodiment

Hereinafter, an embodiment of the present invention will be described with reference to the drawings.

Figure 1:
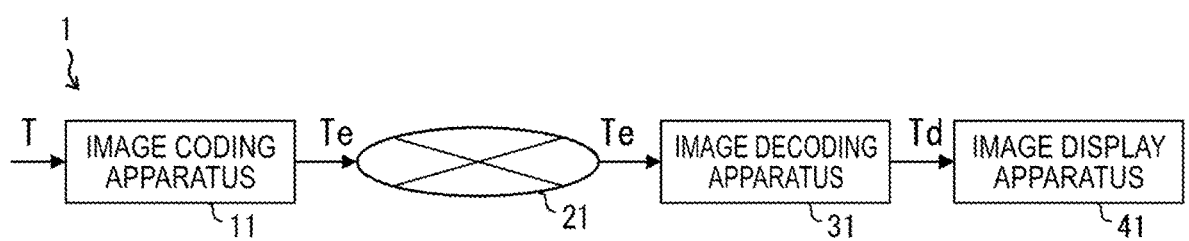
FIG. 1 is a schematic diagram illustrating a configuration of an image transmission system according to an embodiment of the present invention.

FIG. 1 is a schematic diagram illustrating a configuration of an image transmission system 1 according to the present embodiment.

The image transmission system 1 is a system in which a coding stream obtained by coding a target image is transmitted, the transmitted coding stream is decoded, and thus an image is displayed. The image transmission system 1 includes a video coding apparatus (image coding apparatus) 11, a network 21, a video decoding apparatus (image decoding apparatus) 31, and a video display apparatus (image display apparatus) 41.

An image T is input to the video coding apparatus 11.

The network 21 transmits a coding stream Te generated by the video coding apparatus 11 to the video decoding apparatus 31. The network 21 is the Internet, a Wide Area Network (WAN), a Local Area Network (LAN), or a combination thereof. The network 21 is not necessarily limited to a bidirectional communication network, and may be a unidirectional communication network configured to transmit broadcast waves of digital terrestrial television broadcasting, satellite broadcasting, or the like. The network 21 may be substituted by a storage medium in which the coding stream Te is recorded, such as a Digital Versatile Disc (DVD) (trade name) or a Blue-ray Disc (BD) (trade name).

The video decoding apparatus 31 decodes each of the coding streams Te transmitted from the network 21 and generates one or multiple decoded images Td.

The video display apparatus 41 displays all or part of one or multiple decoded images Td generated by the video decoding apparatus 31. For example, the video display apparatus 41 includes a display device such as a liquid crystal display and an organic Electro-luminescence (EL) display. Forms of the display include a stationary type, a mobile type, an HMD type, and the like. In a case that the video decoding apparatus 31 has a high processing capability, an image having high image quality is displayed, and in a case that the apparatus has a lower processing capability, an image which does not require high processing capability and display capability is displayed.

Operators

Operators used in the present specification will be described below.

$>>$ is a right bit shift, $<<$ is a left bit shift, & is a bitwise AND, | is a bitwise OR, |= is an OR assignment operator, and || indicates a logical sum.

x?y:z is a ternary operator that takes y in a case that x is true (other than 0) and takes z in a case that x is false (0).

Clip3(a, b, c) is a function to clip c in a value from a to b, and a function that returns a in a case that c is smaller than a (c<a), returns b in a case that c is greater than b (c>b), and returns c in the other cases (provided that a is smaller than or equal to b (a<=b)).

abs(a) is a function that returns the absolute value of a.

Int(a) is a function that returns the integer value of a.

floor(a) is a function that returns the maximum integer equal to or less than a.

ceil(a) is a function that returns the minimum integer equal to or greater than a.

a/d represents division of a by d (round down decimal places).

Structure of Coding Stream Te

Prior to the detailed description of the video coding apparatus 11 and the video decoding apparatus 31 according to the present embodiment, a data structure of the coding stream Te generated by the video coding apparatus 11 and decoded by the video decoding apparatus 31 will be described.

Figure 2:
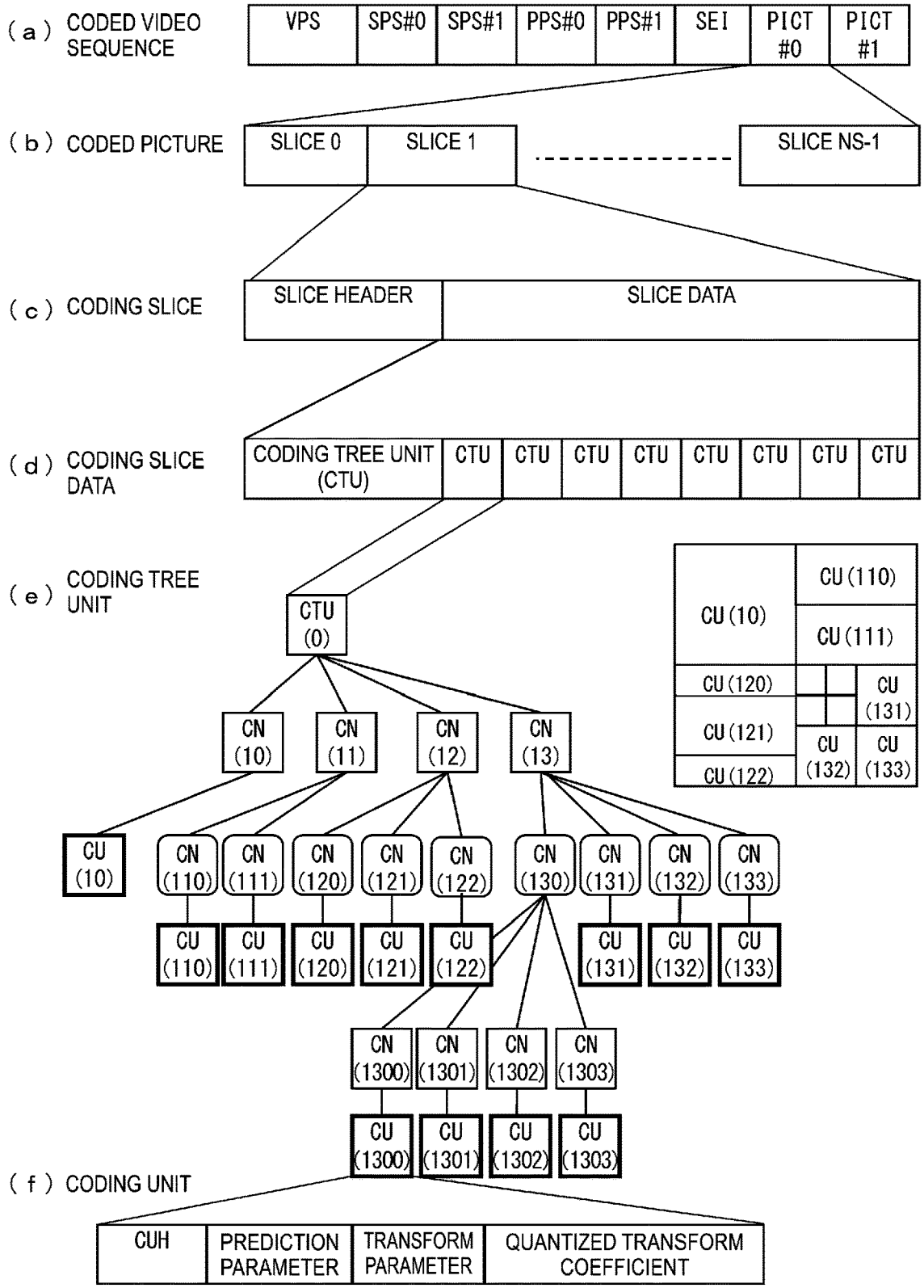
FIG. 2 is a diagram illustrating a hierarchical structure of data of a coding stream.

FIG. 2 is a diagram illustrating the hierarchy structure of data in the coding stream Te. The coding stream Te includes a sequence and multiple pictures constituting the sequence illustratively. (a) to (f) of FIG. 2 are diagrams illustrating a coded video sequence predefining a sequence SEQ, a coded picture defining a picture PICT, a coding slice defining a slice S, a coding slice data defining slice data, a coding tree unit included in the coding slice data, and a coding unit included in the coding tree unit, respectively.

Coded Video Sequence

In the coded video sequence, a set of data referenced by the video decoding apparatus 31 to decode the sequence SEQ to be processed is defined. As illustrated in FIG. 2, the sequence SEQ includes a Video Parameter Set, Sequence Parameter Sets SPS, Picture Parameter Sets PPS, an Adaptation Parameter Set (APS), a picture PICT, and Supplemental Enhancement Information SEI.

In each of the video parameter sets VPS, for a video including multiple layers, a set of coding parameters common to multiple videos and a set of coding parameters associated with the multiple layers and an individual layer included in the video are defined.

In the sequence parameter set SPS, a set of coding parameters referenced by the video decoding apparatus 31 to decode a target sequence is defined. For example, a width and a height of a picture are defined. Note that multiple SPSs may exist. In that case, any of the multiple SPSs is selected from the PPSs.

In each of the picture parameter sets PPS, a set of coding parameters referenced by the video decoding apparatus 31 to decode each picture in a target sequence is defined. For example, a reference value (pic_init_qp_minus26) of a quantization step size used for decoding of a picture and a flag (weighted_pred_flag) indicating an application of weighted prediction are included. Note that multiple PPSs may exist. In that case, any of the multiple PPSs is selected from each picture in a target sequence.

Coded Picture

In the coded picture, a set of data referenced by the video decoding apparatus 31 to decode a picture PICT to be processed is defined. The picture PICT includes slice 0 to slice NS−1 (NS is the total number of slices included in the picture PICT) as illustrated in FIG. 2.

Note that in a case that it is not necessary to distinguish each of the slice 0 to the slice NS−1 below, numeric suffixes of reference signs may be omitted. The same applies to other data with suffixes included in the coding stream Te which will be described below.

Coding Slice

In each coding slice, a set of data referenced by the video decoding apparatus 31 to decode a slice S to be processed is defined. The slice includes a slice header and slice data as illustrated in FIG. 2.

The slice header includes a coding parameter group referenced by the video decoding apparatus 31 to determine a decoding method for a target slice. Slice type indication information (slice_type) indicating a slice type is one example of a coding parameter included in the slice header.

Examples of slice types that can be specified by the slice type specification information include (1) an I slice using only intra-prediction in coding, (2) a P slice using a unidirectional prediction or intra-prediction in coding, and (3) a B slice using unidirectional prediction, bidirectional prediction, or intra-prediction in coding, and the like. Note that the inter-prediction is not limited to uni-prediction and bi-prediction, and the prediction image may be generated by using a larger number of reference pictures. Hereinafter, a slice called a P or B slice indicates a slice including a block in which inter-prediction can be used.

Note that the slice header may include a reference to the picture parameter set PPS (pic_parameter_set_id).

Coding Slice Data

In coding slice data, a set of data referenced by the video decoding apparatus 31 to decode slice data to be processed is defined. The slice data includes CTUs as illustrated in FIG. 2(d). A CTU is a block in a fixed size (for example, 64×64) constituting a slice, and may also be called a Largest Coding Unit (LCU).

Coding Tree Unit

In FIG. 2, a set of data referenced by the video decoding apparatus 31 to decode a CTU to be processed is defined. Each CTU is split into coding units CUs, each of which is a basic unit of coding processing, by recursive Quad Tree split (QT split), Binary Tree split (BT split), or Ternary Tree split (TT split). The BT split and the TT split are collectively referred to as Multi Tree split (MT split). Nodes of a tree structure obtained by recursive quad tree split are referred to as Coding Nodes. Intermediate nodes of a quad tree, a binary tree, and a ternary tree are coding nodes, and the CTU itself is also defined as the highest coding node.

The CT includes, as CT information, a CU split flag (split_cu_flag) indicating whether to perform a CT split, a QT split flag (qt_split_cu_flag) indicating whether to perform a QT split, an MT split direction (mtt_split_cu_vertical_flag) indicating a split direction of MT split, and an MT split type (mtt_split_cu_binary_flag) indicating a split type of the MT split. split_cu_flag, qt_split_cu_flag, mtt_split_cu_vertical_flag, and mtt_split_cu_binary_flag are transmitted to each coding node.

Different trees may be used between luminance and chrominance. The type of the tree is represented by tree-Type. For example, in a case that a common tree is used for luminance (Y, cIdx=0) and chrominance (Cb/Cr, cIdx=1, 2), a common single tree is represented by treeType=SINGLE_TREE. In a case that two different trees (DUAL tree) are used for luminance and chrominance, the tree of luminance is represented by treeType=DUAL_TREE_LUMA, and the tree of chrominance is represented by treeType=DUAL_TREE_CHROMA.

Coding Unit

In FIG. 2, a set of data referenced by the video decoding apparatus 31 to decode a coding unit to be processed is defined. Specifically, a CU includes a CU header CUH, a prediction parameter, a transform parameter, a quantized transform coefficient, and the like. In the CU header, a prediction mode and the like are defined.

There are cases that the prediction processing is performed in units of CUs or performed in units of sub-CUs obtained by further splitting a CU. In a case that the sizes of a CU and a sub-CU are equal to each other, the number of sub-CUs in the CU is one. In a case that a CU is larger in size than a sub-CU, the CU is split into sub-CUs. For example, in a case that a CU has a size of 8×8, and a sub-CU has a size of 4×4, the CU is split into four sub-CUs which include two horizontal splits and two vertical splits.

Types of prediction (prediction mode) include intra-prediction (MODE_INTRA), inter-prediction (MODE_INTER), and an intra-block copy (MODE_IBC). Intra-prediction refers to prediction in an identical picture, and inter-prediction refers to prediction processing performed between different pictures (for example, between pictures of different display times, and between pictures of different layer images).

Transform and quantization processing is performed in units of CUs, but the quantized transform coefficient may be subjected to entropy coding in units of subblocks such as 4×4.

Prediction Parameters

A prediction image is derived by prediction parameters accompanied by a block. The prediction parameters include prediction parameters for intra-prediction and inter-prediction.

Prediction Parameters for Intra-Prediction

The prediction parameters for intra-prediction will be described. The intra-prediction parameters include a luma prediction mode IntraPredModeY (predModeIntra) and a chroma prediction mode IntraPredModeC. There are 67 types (0 to 66) intra-prediction modes. For example, there are planar prediction (0), DC prediction (1), and Angular prediction (2 to 66).

Prediction Parameters for Inter-Prediction

The prediction parameters for inter-prediction will be described. The inter-prediction parameters include prediction list utilization flags predFlagL0 and predFlagL1, reference picture indices refIdxL0 and refIdxL1, and motion vectors mvL0 and mvL1. predFlagL0 and predFlagL1 are flags indicating whether reference picture lists (L0 list and L1 list) are used, and in a case that the value of each of the flags is 1, a corresponding reference picture list is used. Note that, in a case that the present specification mentions "a flag indicating whether it indicates XX", a flag being other than 0 (for example, 1) assumes a case of being XX, and a flag being 0 assumes a case of not being XX, and 1 is treated as true and 0 is treated as false in a logical negation, a logical product, and the like (hereinafter, the same is applied). However, other values can be used for true values and false values in real apparatuses and methods.

Syntax elements for deriving inter-prediction parameters include, for example, merge flag merge_flag (general_merge_flag), merge index merge_idx, merge_subblock_flag indicating whether to use inter-prediction in units of sub-block such as an affine mode, regular_merge_flag, intra-inter flag ciip_flag, GPM_flag indicating whether to use a Geometric partitioning merge mode (GPM mode), merge_gpm_partition_idx indicating a split shape of the GPM mode, merge_gpm_idx0 and merge_gpm_idx1 indicating merge indices of GPM, inter-prediction identifier inter_pred_idc for selecting a reference picture to be used in an AMVP mode, reference picture index refIdxLX, prediction vector index mvp_LX_idx for deriving a motion vector, difference vector mvdLX, and motion vector precision mode amvr_mode. Further, GPM_flag (MergeGpmFlag) may not be explicitly coded and may be derived as GPM_flag=1 (MergeGpmFlag=1) in a case that ciip_flag is zero (0).

Reference Picture List

A reference picture list is a list including reference pictures stored in a reference picture memory 306.

Merge Prediction and AMVP Prediction

A decoding (coding) method for prediction parameters include a merge prediction (merge) mode (merge mode) and an Advanced Motion Vector Prediction (AMVP) mode, and merge_flag is a flag for identifying the modes. The merge mode is a prediction mode in which some or all of motion vector differences are omitted, and a prediction list utilization flag predFlagLX, reference picture index refIdxLX, and a motion vector mvLX are derived from prediction parameters for neighboring blocks already processed, or the like, without being included in coded data. The AMVP mode is a mode in which inter_pred_idc, refIdxLX, and mvLX are included in the coded data. Further, mvLX is coded as mvp_LX_idx identifying a prediction vector mvpLX and a difference vector mvdLX. In addition, the prediction mode in which the motion vector difference is omitted or simplified is collectively called a general merge mode, and the general merge mode and the AMVP prediction may be selected by general_merge_flag.

Furthermore, in a case that regular_merge_flag is transmitted, and regular_merge_flag is 1, the normal merge mode or the MMVD may be selected, and otherwise the CIIP mode or the GPM mode may be selected.

inter_pred_idc is a value indicating the types and number of reference pictures, and takes any value of PRED_L0, PRED_L1, or PRED_BI. PRED_L0 and PRED_L1 indicate uni-prediction which use one reference picture managed in the L0 list and one reference picture managed in the L1 list, respectively. PRED_BI indicates bi-prediction which uses two reference pictures managed in the L0 list and the L1 list.

merge_idx is an index indicating which prediction parameter is used as a prediction parameter for a target block, among prediction parameter candidates (merge candidates) derived from process-completed blocks.

Motion Vector mvLX indicates a shift amount between blocks in two different pictures. A prediction vector and a difference vector related to mvLX are referred to as mvpLX and mvdLX, respectively.

Inter-Prediction Indicator inter_pred_idc and Prediction List Utilization Flag predFlagLX Relationships between inter_pred_idc and predFlagL0 and predFlagL1 are as follows, and can be transformed into one another.

```
inter_pred_idc = (predFlagL1<<1 ) +predFlagL0
predFlagL0 = inter_pred_idc & 1
predFlagL1 = inter_pred_idc >> 1
```

Further, the inter-prediction parameters may use a prediction list utilization flag or may use an inter-prediction identifier. In addition, determination using a prediction list utilization flag may be replaced with determination using an inter-prediction identifier. On the contrary, determination using an inter-prediction identifier may be replaced with determination using a prediction list utilization flag.

Configuration of Video Decoding Apparatus

Figure 3:
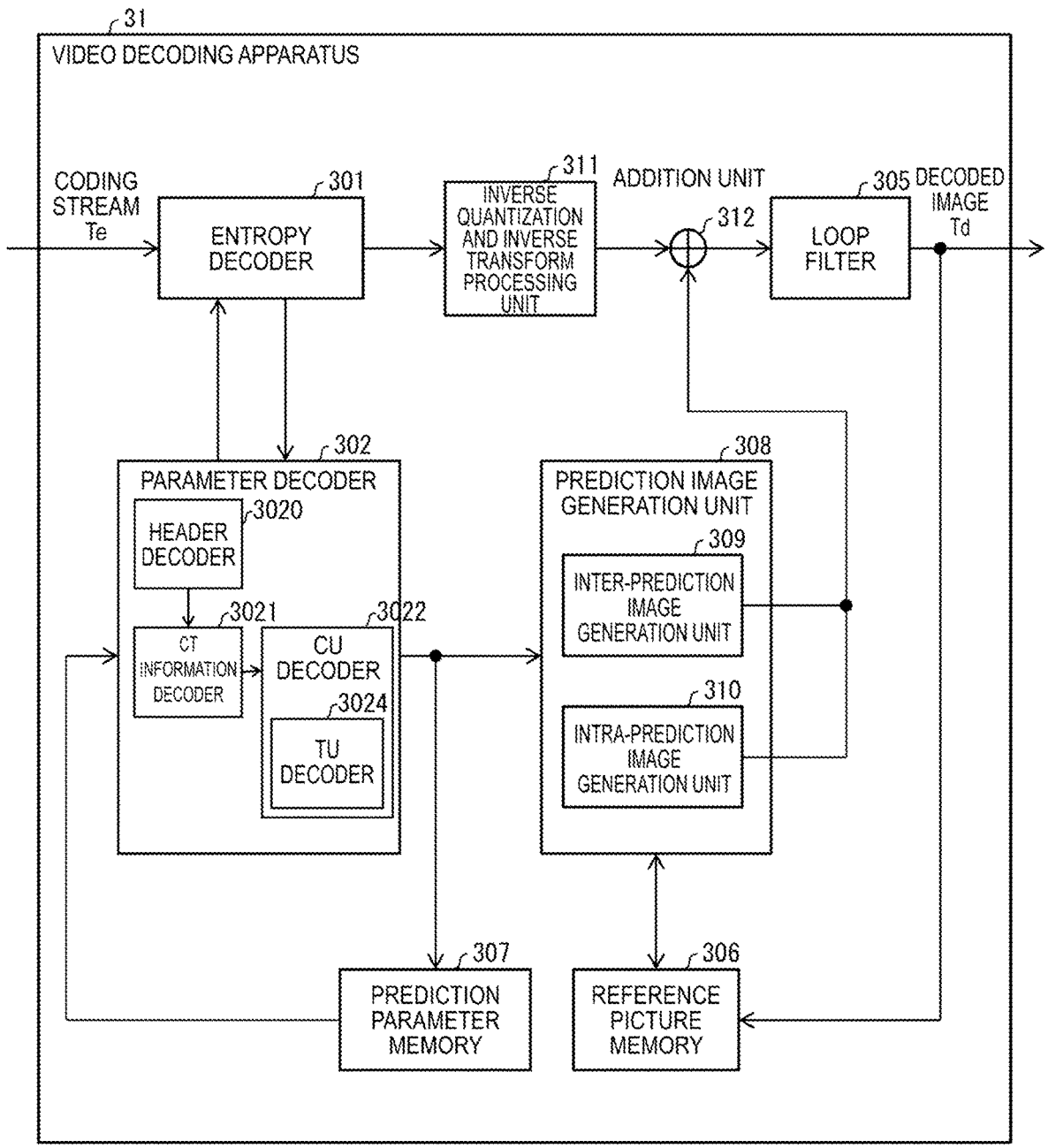
FIG. 3 is a schematic diagram illustrating a configuration of a video decoding apparatus.

A configuration of the video decoding apparatus 31 (FIG. 3) according to the present embodiment will be described.

The video decoding apparatus 31 includes an entropy decoder 301, a parameter decoder (a prediction image decoding apparatus) 302, a loop filter 305, the reference picture memory 306, a prediction parameter memory 307, a prediction image generation unit (prediction image generation apparatus) 308, an inverse quantization and inverse transform processing unit 311, an addition unit 312, and a prediction parameter derivation unit (not illustrated). Further, a configuration in which the loop filter 305 is not included in the video decoding apparatus 31 may be used in accordance with the video coding apparatus 11 described below.

The parameter decoder 302 further includes a header decoder 3020, a CT information decoder 3021, and a CU decoder 3022 (prediction mode decoder), and the CU decoder 3022 further includes a TU decoder 3024. These may be collectively referred to as a decoding module. The header decoder 3020 decodes, from coded data, parameter set information such as a VPS, a SPS, a PPS, and an APS, and a slice header (slice information). The CT information decoder 3021 decodes a CT from coded data. The CU decoder 3022 decodes a CU from coded data. In a case that a TU includes a prediction error, the TU decoder 3024 decodes QP update information (quantization correction value) and a quantization prediction error (residual_coding) from coded data.

The header decoder 3020 decodes a flag sps_lfnst_enabled_flag indicating whether to use non-separable transform from the SPS. In addition, in a case that sps_lfnst_enabled_flag is 1, the header decoder 3020 decodes ph_lfnst_enabled_flag from a picture header (PH). In a case that ph_lfnst_enabled_flag does not appear, ph_lfnst_enabled_flag is inferred to be zero (0). Alternatively, in a case that ph_lfnst_enabled_flag does not appear, a value of ph_lfnst_enabled_flag may be configured equal to a value of sps_lfnst_enabled_flag.

GPM non-separable transform in the present invention is inverse non-separable transform (and non-separable transform) in a case that inter-prediction is in the GPM mode. A method of deriving a transformation matrix or set of transformation matrices for non-separable transform from the split shape of the GPM in a case of being adapted to an inter-CU will be described below.

FIG. 21 is an example of a syntax table showing coding parameters for GPM non-separable transform.

The header decoder 3020 decodes a flag sps_gpm_lfnst_enabled_flag from the SPS. sps_gpm_lfnst_enabled_flag is a flag indicating whether to use GPM non-separable transform in a case of GPM prediction. In a case that sps_lfnst_enabled_flag is 1 and sps_gpm_enabled_flag is 1, the header decoder 3020 decodes sps_gpm_lfnst_enabled_flag. In this example, in a case that sps_lfnst_enabled_flag==0 or sps_gpm_enabled_flag==0, sps_gpm_lfnst_enabled_flag is not transmitted, so the effect of improved coding efficiency is exhibited. Further, sps_gpm_enabled_flag is a flag indicating whether the GPM prediction mode is used in the target sequence.

The TU decoder 3024 decodes an index mts_idx indicating a transform basis from the coded data. In addition, the TU decoder 3024 decodes, from the coded data, a parameter lfnst_idx indicating whether a non-separable transform is used and the transform basis. To be more specific, the TU decoder 3024 decodes lfnst_idx in a case that the widths and heights of the CUs are equal to or greater than 4 and the prediction mode is the intra-prediction mode. Further, lfnst_idx being 0 indicates non-application of non-separable transform, lfnst_idx being 1 indicates one transformation matrix of a set (pair) of transformation matrices (transformation basis) of non-separable transform, and lfnst_idx being 2 indicates the other transformation matrix of the pair of transformation matrices.

The prediction image generation unit 308 includes an inter-prediction image generation unit 309 (FIG. 6) and an intra-prediction image generation unit 310.

Figure 5:
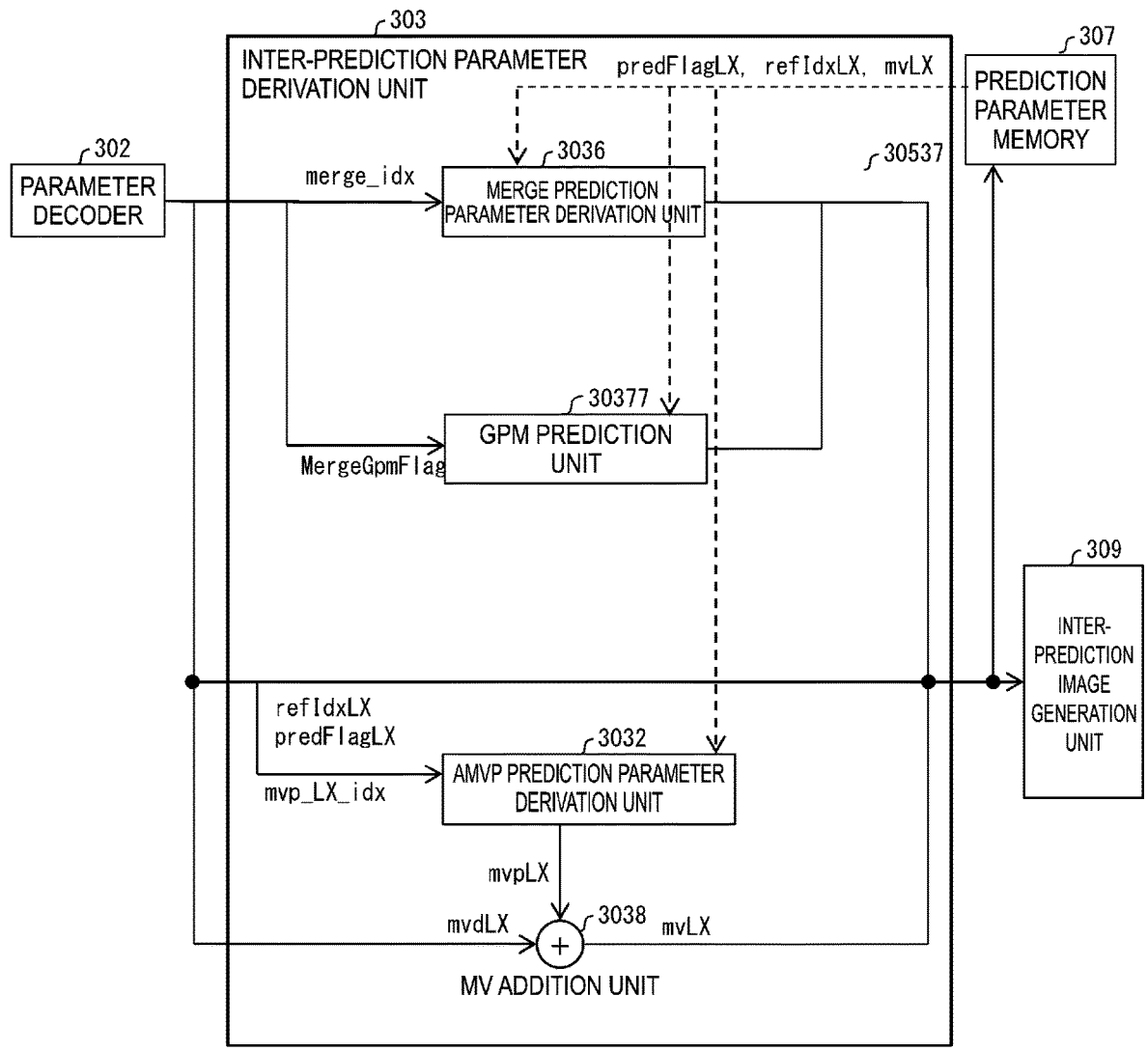
FIG. 5 is a schematic diagram illustrating a configuration of an inter-prediction parameter derivation unit.

The prediction parameter derivation unit includes an inter-prediction parameter derivation unit 303 (FIG. 5) and an intra-prediction parameter derivation unit.

In addition, an example in which CTUs and CUs are used as processing unit will be described below, but the processing is not limited to this example, and processing in units of sub-CUs may be performed. Alternatively, the CTUs and the CUS may be replaced with blocks, the sub-CUs may be replaced with by subblocks, and processing may be performed in units of blocks or subblocks.

The entropy decoder 301 performs entropy decoding on the coding stream Te input from the outside and decodes individual codes (syntax elements). The entropy coding includes a scheme in which syntax elements are subjected to variable-length coding by using a context (probability model) that is adaptively selected according to a type of the syntax elements and a surrounding condition, and a scheme in which syntax elements are subjected to variable-length coding by using a table or a calculation expression that is determined in advance.

The entropy decoder 301 outputs the decoded codes to the parameter decoder 302. The decoded code is, for example, a prediction mode predMode, merge_flag, merge_idx, inter_pred_idc, refIdxLX, mvp_LX_idx, mvdLX, amvr_mode, and the like. Which code is to be decoded is controlled based on an indication of the parameter decoder 302.

Basic Flow

Figure 4:
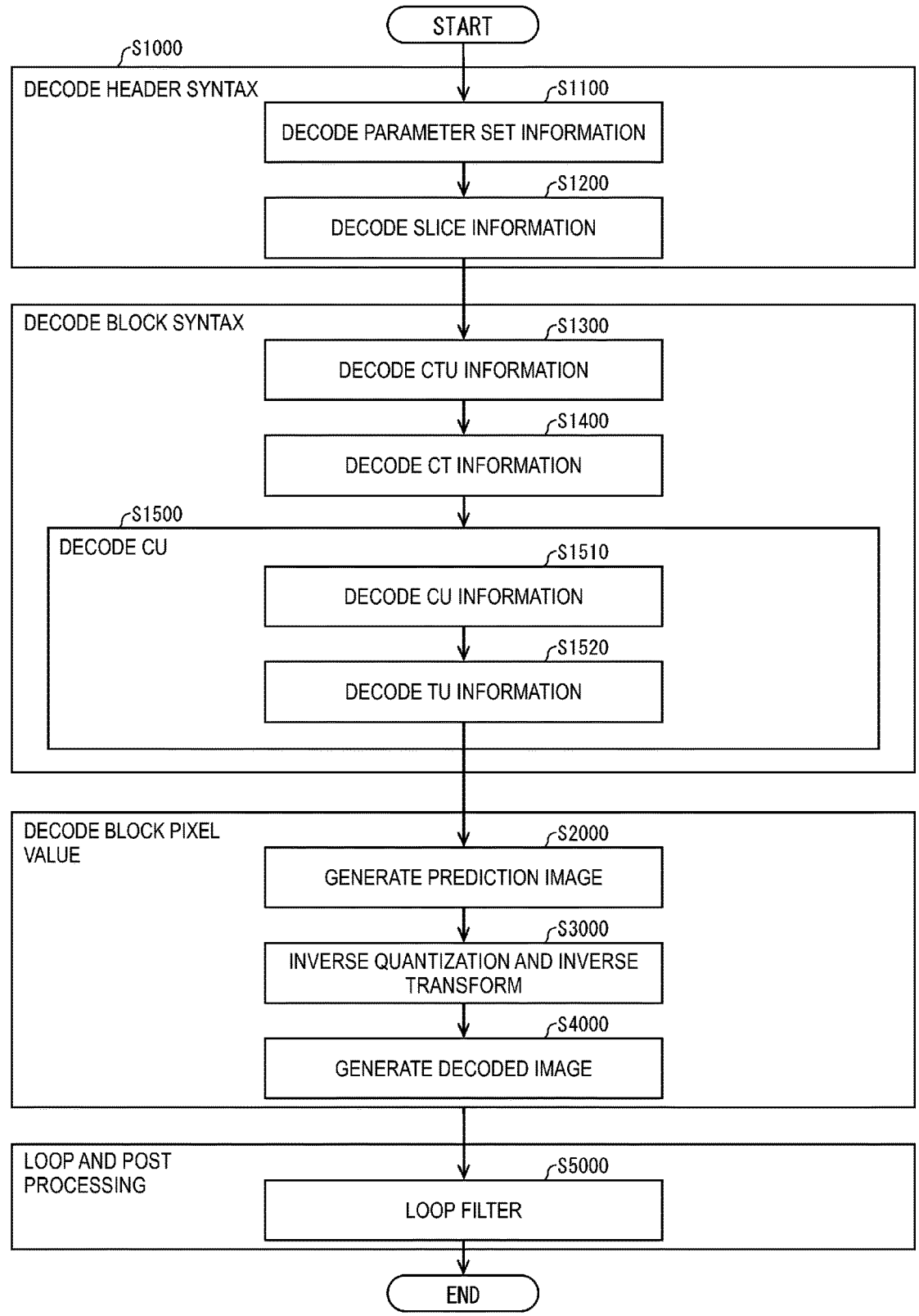
FIG. 4 is a flowchart for describing a schematic operation performed by the video decoding apparatus.

FIG. 4 is a flowchart for describing a schematic operation performed by the video decoding apparatus 31.

(S1100: Decoding of parameter set information) The header decoder 3020 decodes parameter set information such as a VPS, an SPS, and a PPS from coded data.

(S1200: Decoding of slice information) The header decoder 3020 decodes the slice header (slice information) from the coded data.

Afterwards, the video decoding apparatus 31 repeats the processing from S1300 to S5000 for each CTU included in the target picture, and thereby derives a decoded image of each CTU.

(S1300: Decoding of CTU information) The CT information decoder 3021 decodes the CTU from the coded data.

(S1400: Decoding of CT information) The CT information decoder 3021 decodes the CT from the coded data.

(S1500: Decoding of CU) The CU decoder 3022 decodes the CU from the coded data by performing S1510 and S1520.

(S1510: Decoding of CU information) The CU decoder 3022 decodes CU information, prediction information, a TU split flag split_transform_flag, CU residual flags cbf_cb, cbf_cr, and cbf_luma from the coded data.

(S1520: Decoding of TU information) In a case that a prediction error is included in the TU, the TU decoder 3024 decodes, from the coded data, a quantization prediction error, and a transform index mts_idx.

(S2000: Generation of prediction image) The prediction image generation unit 308 generates a prediction image based on the prediction information for each block included in the target CU.

(S3000: Inverse quantization and inverse transform) The inverse quantization and inverse transform processing unit 311 performs an inverse quantization and inverse transforming processing on each TU included in the target CU.

(S4000: Generation of decoded image) The addition unit 312 generates a decoded image of the target CU by adding the prediction image supplied by the prediction image generation unit 308 and the prediction error supplied by the inverse quantization and inverse transform processing unit 311.

(S5000: Loop filter) The loop filter 305 generates a decoded image by applying a loop filter such as a deblocking filter, an SAO, and an ALF to the decoded image.

Configuration of Intra-Prediction Parameter Derivation Unit

The intra-prediction parameter derivation unit decodes an intra-prediction parameter, for example, an intra-prediction mode IntraPredMode, with reference to the prediction parameters stored in the prediction parameter memory 307 based on codes input from the entropy decoder 301. The intra-prediction parameter derivation unit outputs the decoded intra-prediction parameter to the prediction image generation unit 308, and stores the decoded intra-prediction parameter in the prediction parameter memory 307. The intra-prediction parameter derivation unit may derive different intra-prediction modes in luminance and chrominance.

The loop filter 305 is a filter provided in the coding loop, and is a filter that removes block distortion and ringing distortion and improves image quality. The loop filter 305 applies a filter such as a deblocking filter, a Sample Adaptive Offset (SAO), and an Adaptive Loop Filter (ALF) to a decoded image of a CU generated by the addition unit 312.

The reference picture memory 306 stores a decoded image of the CU generated by the addition unit 312 in a predetermined position for each target picture and target CU.

The prediction parameter memory 307 stores a prediction parameter in a position predetermined for each CTU or CU to be decoded. Specifically, the prediction parameter memory 307 stores a parameter decoded by the parameter decoder 302, the prediction mode predMode separated by the entropy decoder 301, and the like.

The prediction mode predMode, the prediction parameter, and the like are input to the prediction image generation unit 308. In addition, the prediction image generation unit 308 reads a reference picture from the reference picture memory 306. The prediction image generation unit 308 generates a prediction image of a block or a subblock by using the prediction parameter and the read reference picture (reference picture block) in the prediction mode indicated by the prediction mode predMode. Here, the reference picture block refers to a set of pixels (referred to as a block because they are normally rectangular) on a reference picture and is a region that is referenced for generating a prediction image.

The intra-prediction image generation unit 310 references decoded pixel values read out and the prediction mode indicated by IntraPredMode to generate a prediction image of the target block. The intra-prediction image generation unit 310 outputs the generated prediction image of the block to the addition unit 312.

Configuration of Inter-Prediction Parameter Derivation Unit

The inter-prediction parameter derivation unit 303 derives an inter-prediction parameter with reference to the prediction parameters stored in the prediction parameter memory 307 based on the syntax element input from the parameter decoder 302. In addition, the inter-prediction parameter is output to the inter-prediction image generation unit 309 and the prediction parameter memory 307. Since the inter-prediction parameter derivation unit 303 and an AMVP prediction parameter derivation unit 3032, a merge prediction parameter derivation unit 3036, a GPM prediction unit 30377, and a MV addition unit 3038 serving as internal elements of the inter-prediction parameter derivation unit 303 are sections common to the video coding apparatus and the video decoding apparatus, they may be collectively referred to as a motion vector derivation unit (motion vector derivation apparatus).

In a case that GPM_Flag indicates 1, that is, a GPM prediction mode, the GPM prediction unit 30377 derives a GPM prediction parameter.

In a case that merge_flag indicates 1, that is, the merge prediction mode, merge_idx is derived and output to the merge prediction parameter derivation unit 3036.

In a case that merge_flag indicates 0, that is, the AMVP prediction mode, the AMVP prediction parameter derivation unit 3032 derives mvpLX from inter_pred_idc, refIdxLX, or mvp_LX_idx.

MV Addition Unit

The MV addition unit 3038 adds derived mvpLX and mvdLX together to derive mvLX.

Merge Prediction

The merge prediction parameter derivation unit 3036 includes a merge candidate derivation unit and a merge candidate selection unit. Further, a merge candidate includes the prediction parameters (predFlagLX, mvLX, and refIdxLX) and is stored in a merge candidate list. The merge candidate stored in the merge candidate list has an index assigned in accordance with a prescribed rule.

The merge candidate derivation unit derives the merge candidate using the motion vector and refIdxLX for the decoded neighboring block without any change. In addition, the merge candidate derivation unit may apply spatial merge candidate derivation processing, temporal merge candidate derivation processing, and the like described below.

As the spatial merge candidate derivation processing, the merge candidate derivation unit reads the prediction parameter stored in the prediction parameter memory 307 in accordance with the prescribed rule, and configures the prediction parameter as a merge candidate. A reference picture indication method is, for example, a prediction parameter related to each of the neighboring blocks located within a prescribed range from the target block (e.g., all or some of the blocks adjoining the left A1, right B1, top right B0, bottom left A0, and top left B2 of the target block, respectively). The merge candidates are referred to as A1, B1, B0, A0, and B2. Here, A1, B1, B0, A0, and B2 are motion information derived from blocks including the following coordinates.

A1: (xCb − 1, yCb + cbHeight − 1)
B1: (xCb + cbWidth − 1, yCb − 1)
B0: (xCb + cbWidth, yCb − 1)
A0% (xCb − 1, yCb + cbHeight)
B2: (xCb − 1, yCb − 1)

The target block has upper left coordinates (xCb, yCb), a width cbWidth, and a height cbHeight.

As temporal merge derivation processing, the merge candidate derivation unit reads, from the prediction parameter memory 307, the prediction parameter for a block C in the reference image including the bottom right coordinates CBR or the center coordinates of the target block as a merge candidate Col, and stores the block C in the merge candidate list mergeCandList[ ].

The order of storage in mergeCandList[ ] is spatial merge candidates (B1, A1, B0, A0, and B2), and the temporal merge candidate Col. Further, a reference block that is not available (intra-prediction block, or the like) is not stored in the merge candidate list.

```
i = 0
if( availableflagB1 )
    mergeCandList[ i++ ] = B1
if( availableflagA1 )
    mergeCandList[ i++ ] = A1
if( availableFlagB0 )
    mergeCandList[ i++ ] = B0
if( availableFlagA0 )
    mergeCandList[ i++ ] = A0
if( availableflagB2 )
    mergeCandList[ i++ ] = B2
if ( availableFlagCol )
    mergeCandList[ i++ ] = Col
```

Furthermore, the history merge candidate HmvpCand, the average candidate avgCand, and the zero merge candidate zeroCandm may be added to mergeCandList [ ] and used.

The merge candidate selection unit selects a merge candidate N indicated by merge_idx from the merge candidates included in the merge candidate list in the formula below.

$$N = mergeCandList[merge\_idx]$$

Here, N is a label indicating a merge candidate, and takes A1, B1, B0, A0, B2, Col, and the like. The motion information of the merge candidate indicated by the label Nis indicated by (mvLXN[0], mvLXN[0]), predFlagLXN, and refIdxLXN.

The selected (mvLXN[0], mvLXN[0]), predFlagLXN, and refIdxLXN are selected as inter-prediction parameters for the target block. The merge candidate selection unit stores the inter-prediction parameter for the selected merge candidate in the prediction parameter memory 307 and outputs the inter-prediction parameter to the inter-prediction image generation unit 309.

GPM Prediction

GPM prediction will be described. GPM prediction is prediction used in the GPM mode and generates a prediction image as two non-rectangular prediction units obtained by dividing a target CU by a line segment. FIG. 9(a) illustrates examples of straight line segments. The straight line segments crossing the target CU are defined by an angle index angleIdx (angle variable) and a distance index distanceIdx (distance variable) indicated in FIG. 9(b). angleIdx represents an angle φ formed by a straight line in the vertical direction and the straight line segment. distanceIdx indicates a distance ρ from the center of the target CU to the straight line segment. angleIdx is an angle of a straight line segment allocated to an integer value, and for example, in a case that 360 degrees is roughly divided into 32 equal parts, the values indicated in FIG. 9(c) are allocated. Further, in this example, as roughly described above, 360 degrees is divided into 32 using a square scale (coordinates) rather than being divided perfectly equally. Further, 360 degrees may be divided into 64, and a finer angle index may be sent.

In the prediction image generation in GPM prediction, two "rectangular" prediction images (temporary prediction images) including a non-rectangular prediction unit may be derived, and the two rectangular regions may be derived by performing weighting according to the shape of the non-rectangular prediction unit. A motion compensation unit 3091 derives two temporary prediction images of the target CU, and a GPM combining unit 30952 derives a prediction image by applying weighting processing corresponding to the position of a pixel to each pixel of the two temporary prediction images. This processing is referred to as a GPM combining process. Processing other than prediction (e.g., transform (inverse transform) and quantization (inverse quantization)) is applied to the entire target CU.

The GPM prediction unit 30377 derives the prediction parameters corresponding to the two non-rectangular regions and supplies the prediction parameters to the inter-prediction image generation unit 309. The GPM prediction may be configured not to use bi-prediction for simplification of processing. In this case, an inter-prediction parameter for uni-prediction is derived in one non-rectangular region.

Decoding of Syntax in GPM Prediction

The on/off of GPM prediction and the parameters in a case that GPM prediction is on are signaled in coded data as follows.

As shown in FIG. 10(a), sps_gpm_enabled_flag is signaled by the SPS and indicates whether the GPM prediction mode is used in the target sequence. sps_gpm_enabled_flag equal to 0 indicates that the GPM prediction mode is not used in the target sequence. sps_gpm_enabled_flag equal to 1 indicates that the GPM prediction mode is used in the target sequence. Here, it is indicated that a GPM prediction mode in which the number of selectable division patterns (division types) is NumGPMFull (for example, 64) is used in the target sequence. Further, sps_gpm_enabled_flag is not limited to the SPS and may be transmitted in the PPS, the picture header, or the slice header.

FIG. 10(b) is a diagram illustrating a syntax configuration signaled in the merge mode. The parameter decoder 302 decodes syntax elements in the coded data, and the GPM prediction unit 30377 (inter-prediction parameter derivation unit 303) derives parameters for GPM prediction in accordance with the following rules.

In the SPS, sps_max_num_merge_cand_minus_max_num_gpm_cand is signaled. sps_max_num_merge_cand_minus_max_num_gpm_cand is a parameter used to derive the maximum value MaxNumGpmMergeCand of the number of merge candidates for GPM prediction. The GPM prediction unit 30377 derives merge candidates MergeCand from 0 to the maximum value MaxNumMergeCand−1 of the number of candidates for merge prediction.

In a case that sps_gpm_enabled_flag is on and MaxNumMergeCand is greater than or equal to 3, MaxNumGpmMergeCand is derived by the following formula.

MaxNumGpmCand = MaxNumMergeCand − sps_max_num_merge_cand_minus_max_num_gpm_cand

In a case that sps_gpm_enabled_flag is on and MaxNumMergeCand is 2, then the MaxNumGpmMergeCand is derived by the following formula.

MaxNumGpmMergeCand = 2

In a case that none of the above is true, MaxNumGpmMergeCand is derived by the following formula.

MaxNumGpmMergeCand = 0

In a case that MaxNumGpmMergeCand is zero (0), GPM prediction is prohibited.

general_merge_flag is a flag indicating whether the merge mode is used, which is signaled in a case that the target block is not in the skip mode. In a case of a skip mode, the inter-prediction parameter derivation unit 303 configures the flag to general_merge_flag=1. merge_data ( ) is a syntax structure signaling a parameter of merge prediction.

In a case that ciip_flag is zero (0), the syntax elements merge_gpm_partition_idx, merge_gpm_idx0, and merge_gpm_idx1 for GPM prediction are signaled. merge_gpm_partition_idx is an index (partition index) indicating a division pattern of the GPM prediction mode. The partition index indicates a combination of angleIdx and distanceIdx that identifies a straight line segment across the target block to divide the target block into two non-rectangular regions. The merge candidates are used as the motion information used for the prediction image generation in GPM prediction. merge_gpm_idx0 and merge_gpm_idx1 are indices of merge candidates indicating motion information of the two non-rectangular regions, respectively. The number of partition index options (the number of division patterns) is NumGPMFull, and merge_gpm_partition_idx takes any integer value from 0 to NumGPMFull−1 (=63).

MergeGpmFlag is a flag indicating whether to perform GPM prediction in a target block. In a case that all of the following conditions (GPM determination conditions) are satisfied, the GPM prediction unit 30377 configures MergeGpmFlag=1 (GPM prediction is on); otherwise, the GPM prediction unit 30377 configures MergeGpmFlag=0.

. sps_gpm_enabled_flag = 1
. slice_type indicates a B slice.
. general_merge_flag = 1
. cbWidth > = 8 and cbHeight > = 8
. cbWidth < 8 * cbHeight and cbHeight < 8 * cbWidth
. regular_merge_flag = 0
. merge_subblock_flag = 0
. ciip_flag = 0

In the case of MergeGpmFlag=1, the GPM prediction unit 30377 derives parameters necessary for prediction image generation in the following procedure, and outputs the parameters to the GPM combining unit 30952.

The parameter decoder 302 (CU decoder 3022) decodes merge_gpm_partition_idx, merge_gpm_idx0, and merge_gpm_idx1. In a case of !ciip_flag, the parameter decoder 302 (the CU decoder 3022) may decode merge_gpm_partition_idx and merge_gpm_idx0 and further in a case of MaxNumGpmMergeCand>2, the parameter decoder may decode merge_gpm_idx1.

Motion Information Derivation Processing in GPM Prediction

The GPM prediction unit 30377 derives the merge indices m and n from the syntax elements merge_gpm_idx0 and merge_gpm_idx1 indicating the motion information of the two non-rectangular regions as follows.

```
m = merge_gpm_idx0
n = merge_gpm_idx1 + (merge_gpm_idx1 >= m) ? 1 : 0
```

In the following, the merge candidate indicated by the merge index m is denoted as M and the merge candidate indicated by the merge index n is denoted as N.

The merge prediction parameter derivation unit 3036 derives motion information (mvLXM, mvLXN, refIdxLXM, refIdxLXN, predFlagLXM, predFlagLXN, bcwIdx, mergeCandList, etc.) of the merge candidates M and N by the method described in (Merge Prediction). The GPM prediction unit 30377 uses the motion information to configure the motion vectors mvA and mvB of merge_gpm_idx0 and merge_gpm_idx1, the reference indices refIdxA and refIdxB, and the prediction list flags predListFlagA and predListFlagB.

These pieces of motion information are referenced to generate temporary prediction images of the two non-rectangular regions.

The GPM prediction unit 30377 derives the angleIdx and distanceIdx corresponding to merge_gpm_partition_idx according to the table shown in FIG. 11, and outputs them to the GPM combining unit 30952.

The GPM prediction unit 30377 derives temporary prediction images predSamplesLA and predSamplesLB using the motion information (mvX, refIdxX, predListFlagX, X=AorB), and outputs them to the GPM combining unit 30952. The GPM combining unit 30952 derives a prediction image using the weight parameter derived from an angle variable. More specifically, the prediction image is generated by using the weight information derived using angleIdx and distanceIdx and the temporary prediction images predSamplesLA and predSamplesLB.

Weighted Pixel Prediction Processing in GPM Prediction

The GPM combining unit 30952 derives a prediction pixel value pbSample in the following procedure. Here, nCbW=cbWidth and nCbH=cbHeight. First, the GPM combining unit 30952 derives bitDepth in the following manner for the weighting factor derivation processing and the motion vector storage processing described below in the GPM prediction.

In a case that cIdx is zero (0), the GPM combining unit 30952 configures bitDepth to the number of luminance pixel bits BitDepth Y.

In a case that cIdx is zero (0), the GPM combining unit 30952 configures nW and nH to nCbW and nCbH, respectively. In a case that cIdx is not zero (0), the GPM combining unit 30952 configures nW and nH to nCbW*SubWidthC and nCbH*SubHeightC, respectively. Here, SubWidthC and SubHeightC are values predetermined in accordance with the chrominance format.

In a case that cIdx is zero (0), the GPM combining unit 30952 configures both subW and subH to 1. In a case that cIdx is not zero (0), the GPM combining unit 30952 configures subW and subH to SubWidthC and SubHeightC, respectively.

In a case that cIdx is not zero (0), the GPM combining unit 30952 configures bitDepth to the number of chrominance pixel bits BitDepthC.

Next, the GPM combining unit 30952 derives variables nW, nH, shift1, offset1, displacementX, displacementY, partFlip, and shiftHor as follows.

```
nW = (cIdx == 0) ? nCbW : nCbW * SubWidthC
nH = (cIdx == 0) ? nCbH : nCbH * SubHeightC
shift1 = Max(5, 17 - BitDepth)
offset1 = 1 << (shift1 - 1)
displacementX = angleIdx
displacementY = (angleIdx + 8) % 32
partFlip = (angleIdx>=13 && angleIdx<=27) ? 0 : 1
shiftHor = (angleIdx%16==8 || (angleIdx%16!=0 && nH>nW)) ? 0 : 1
```

In a case that shiftHor is zero (0), the GPM combining unit 30952 derives offsetX and offsetY as follows.

```
offsetX = (-nW) >> 1
offsetY = ((-nH) >> 1) + (angleIdx<16? (distanceIdx * nH) >> 3 : -((distanceIdx * nH) >> 3))
```

In a case that shiftHor is one (1), the GPM combining unit 30952 derives offsetX and offsetY as follows.

```
offsetX = ((-nW) >> 1) + (angleIdx<16? (distanceIdx * nW) >> 3 : -(distanceIdx * nW) >> 3))
offsetY = (-nH) >> 1
```

The GPM combining unit 30952 derives a prediction pixel pbSamples according to the following steps.

1) The GPM combining unit 30952 derives generalized coordinates (xL, yL) from the coordinates (x, y) in the CU.

```
xL = (cIdx == 0) ? x : x * SubWidthC
yL = (cIdx == 0) ? y : y * SubHeightC
```

2) The GPM combining unit 30952 calculates the weight factor wValue according to the coordinates in the CU using disLut shown in FIG. 12 as follows.

```
weightIdx = (((xL + offsetX) << 1) + 1) * disLut[displacementX] + (((yL + o
ffsetY) << 1) + 1) * disLut[displacementY]
  weightIdxL = partFlip? 32 + weightIdx : 32 − weightIdx
  wValue = Clip3(0, 8, (weightIdxL + 4) >> 3)
```

3) The GPM combining unit 30952 derives the value of pbSample as follows.

```
pbSamples[x][y] = Clip3(0), (1 << BitDepth) − 1, (predSamplesLA[x][y] * wVal
ue + predSamplesLB[x][y] * (8 − wValue) + offset1) >> shift1)
```

Motion Vector Storage Processing in GPM Prediction

The GPM prediction unit 30377 stores the motion vectors (mvA and mvB) of the non-rectangular regions A and B and the information of the reference picture (predFlagA, prefFlagB, refIdxLA, and refIdxLB) in the memory in units of 4-by-4 subblocks to be referred to in subsequent processing.

Processing Flow of GPM Prediction

Figure 13:
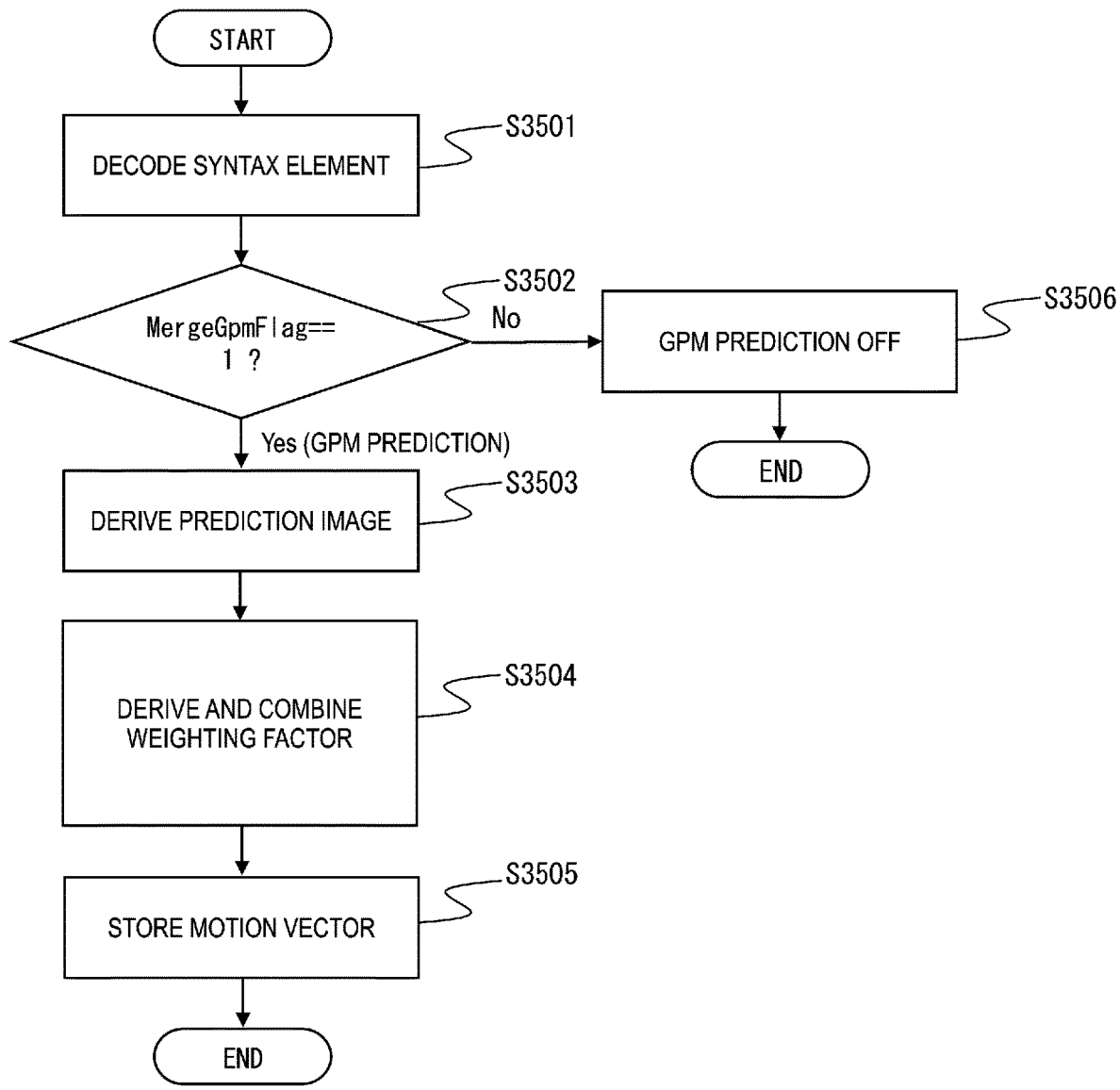
FIG. 13 is a flowchart illustrating a processing flow of GPM prediction.

FIG. 13 is a flowchart illustrating the processing flow of GPM prediction. Hereinafter, the processing flow of GPM prediction will be described on the assumption that all the conditions configure as MergeGpmFlag=1 (GPM prediction on) as described above are satisfied.

In S3501, for example, the parameter decoder 302 appropriately decodes various syntax elements signaled by the SPS, the PPS, the slice header, the merge data, and the like as illustrated in FIG. 4. Then, these syntax elements are output to the inter-prediction parameter derivation unit 303 (the merge prediction parameter derivation unit 3036, the GPM prediction unit 30377, and the like).

In S3502, the GPM prediction unit 30377 determines whether MergeGpmFlag is 1.

In a case that MergeGpmFlag is not 1 in S3502, the GPM prediction unit 30377 turns off the GPM prediction in S3506 and ends the processing.

In a case that MergeGpmFlag is 1 in S3502, the GPM prediction unit 30377 performs the GPM prediction processing in S3503 to S3505.

In S3503, the GPM prediction unit 30377 derives the motion information and further generates two temporary prediction images predSamplesLA and predSamplesLB.

In S3504, the GPM prediction unit 30377 derives the weighting factor wValue and the GPM combining unit 30952 generates a prediction image.

In S3505, the GPM prediction unit 30377 stores the motion vectors in the memory.

AMVP Prediction

The AMVP prediction parameter derivation unit 3032 includes a vector candidate derivation unit and a vector candidate selection unit. The vector candidate derivation unit derives prediction vector candidates from the motion vectors for the decoded neighboring blocks stored in the prediction parameter memory 307 based on refIdxLX, and stores the results in a prediction vector candidate list mvpListLX[ ].

The vector candidate selection unit selects a motion vector mvpListLX[mvp_LX_idx] indicated by mvp_LX_idx, among the prediction vector candidates of mvpListLX[ ], as mvpLX. The vector candidate selection unit outputs mvpLX selected to the MV addition unit 3038.

MV Addition Unit

The MV addition unit 3038 adds mvpLX input from the AMVP prediction parameter derivation unit 3032 to the decoded mvdLX to calculate mvLX. The addition unit 3038 outputs the calculated mvLX to the inter-prediction image generation unit 309 and the prediction parameter memory 307.

```
mvLX[0] = mvpLX[0] + mvdLX[0]
mvLX[1] = mvpLX[1] + mvdLX[1]
```

Inter-Prediction Image Generation Unit 309

In a case that predMode indicates the inter-prediction mode, the inter-prediction image generation unit 309 generates a prediction image of a block or a subblock through inter-prediction by using the inter-prediction parameters input from the inter-prediction parameter derivation unit 303 and the reference picture.

Figure 6:
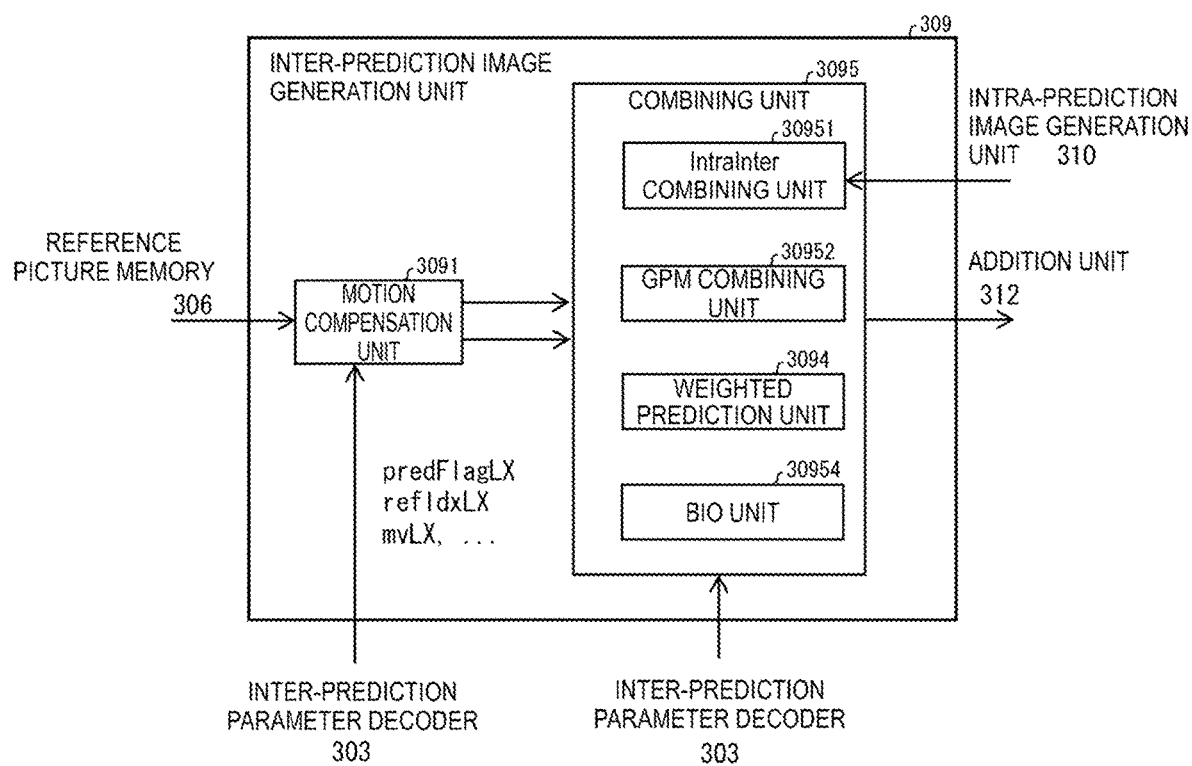
FIG. 6 is a schematic diagram illustrating a configuration of an inter-prediction image generation unit.

FIG. 6 is a schematic diagram illustrating a configuration of the inter-prediction image generation unit 309 included in the prediction image generation unit 308 according to the present embodiment. The inter-prediction image generation unit 309 includes a motion compensation unit (prediction image generation apparatus) 3091 and a combining unit 3095. The combining unit 3095 includes an IntraInter combining unit 30951, a GPM combining unit 30952, a BIO unit 30954, and a weighted prediction unit 3094.

Motion Compensation

The motion compensation unit 3091 (interpolation image generation unit 3091) generates an interpolation image (motion compensation image) by reading a reference block from the reference picture memory 306 based on the inter-prediction parameters (predFlagLX, refIdxLX, and mvLX) input from the inter-prediction parameter derivation unit 303. The reference block is a block located on the reference picture RefPicLX indicated by refIdxLX, at a position shifted by mvLX from the position of the target block. Here, in a case that mvLX does not have an integer precision, an interpolation image is generated by using a filter referred to as a motion compensation filter for generating pixels at the fractional positions.

The motion compensation unit 3091 first derives an integer position (xInt, yInt) and a phase (xFrac, yFrac) corresponding to in-prediction block coordinates (x, y) by the following formula.

```
xInt = xPb+(mvLX[0]>>(log2(MVPREC)))+x
xFrac = mvLx[0]&(MVPREC−1)
yInt = yPb+(mvLX[1]>>(log2(MVPREC)))+y
yFrac = mvLX[1]&(MVPREC−1)
```

Here, (xPb, yPb) indicates the upper left coordinates of a block with a bW*bH size, that is, x=0, . . . , bW−1, y=0, . . . , bH−1, and MVPREC indicates the precision of MVPREC=16.

The motion compensation unit 3091 derives a temporary image temp[ ][ ] by performing a horizontal interpolation on a reference picture refImg using an interpolation filter. In the formula below, Σ is the sum related to k of k=0, . . . , NTAP−1, shift1 is a normalization parameter for adjusting a value range, and offset1=1<<(shift1−1).

$$\text{temp}[x][x] = (\Sigma \text{mcFilter}[x\text{Frac}][k]*\text{refImg}[x\text{Int}+k-\text{NTAP}/2+1][y\text{Int}]+\text{offset1}) >> \text{shift1}$$

Subsequently, the motion compensation unit 3091 derives an interpolation image Pred[ ][ ] by performing a vertical interpolation processing on the temporary image temp[ ][ ]. In the formula below, ρ is the sum related to k of k=0, . . . , NTAP−1, shift2 is a normalization parameter for adjusting a value range, and offset2=1<<(shift2−1).

$$\text{Pred}[x][y] = (\Sigma \text{mcFilter}(y\text{Frac})[k]*\text{temp}[x][y+k-\text{NTAP}/2+1]+\text{offset2}) >> \text{shift2}$$

Further, for bi-prediction, Pred[ ][ ] described above is derived for each of the L0 list and the L1 list (referred to as interpolation images PredL0[ ][ ] and PredL1[ ][ ]), and an interpolation image Pred[ ][ ] is generated from PredL0[ ][ ] and PredL1[ ][ ].

IntraInter Combining Processing

In a case that ciip_mode is 1, the IntraInter combining unit 30951 generates a prediction image by having a prediction image in Combined intrainter prediction (CIIP) mode to be subjected to the weighted sum of an inter-prediction image and an intra-prediction image.

In the CIIP mode, the prediction value of the CIIP mode is calculated by using a weighted average of the inter-prediction image derived in the merge mode and the intra-prediction image derived in planar prediction. The combining weight is determined by the prediction mode of neighboring coding blocks. In a case that intra-prediction is used in both of the two neighboring blocks (in the upper direction and left direction) of the current block, the combining ratio between inter-prediction and intra-prediction is 1:3. On the other hand, in a case that neither of the two neighboring blocks is intra, the combining ratio between inter-prediction and intra-prediction is set to 3:1. In other cases, the ratio is set to 2:2. The same weighting factor is adapted to both luminance and chrominance.

BIO Prediction

Now, the details of a BIO prediction (Bi-Directional Optical Flow, BDOF processing) performed by the BIO unit 30954 will be described. In a bi-prediction mode, the BIO unit 30954 generates a prediction image with reference to two prediction images (first prediction image and second prediction image) and a gradient correction term.

Weighted Prediction

The weighted prediction unit 3094 generates a prediction image of a block by multiplying an interpolation image PredLX by a weighting factor. In a case that one of prediction list utilization flags (predFlagL0 or predFlagL1) is 1 (uni-prediction) and that no weighted prediction is used, processing in accordance with the formula below in which PredLX (LX is L0 or L1) is adapted to the number of pixel bits bitDepth is performed.

Pred[x][y] = Clip3(0, (1<<bitDepth)−1, (PredL0[x][y]+offset1)>>shift1)

Here, shift1=14−bitDepth and offset1=1<<(shift1−1) are established.

In addition, in a case that both of prediction list utilization flags (predFlagL0 and predFlagL1) are 1 (bi-prediction PRED_BI) and that no weighted prediction is used, processing in accordance with the formula below in which PredL0 and PredL1 are averaged and adapted to the number of pixel bits is performed.

Pred[x][y] = Clip3(0, (1<<bitDepth)−1, {PredL0[x][y]+PredL1[x][y]+offset2)>>shift2)

Here, shift2=15−bitDepth and offset2=1<<(shift2−1) are established.

Furthermore, in a case that the uni-prediction and the weighted prediction are performed, the weighted prediction unit 3094 derives a weighted prediction coefficient w0 and an offset o0 from coded data, and performs processing in accordance with the equation below.

Pred[x][y] = Clip3(0, (1<<bitDepth)−1, ((PredLX[x][y]*w0+2 (log2*D−1))>>log2WD)+o0)

Here, log 2WD is a variable indicating a prescribed shift amount.

Furthermore, in a case that the bi-prediction PRED_BI and the weighted prediction are performed, the weighted prediction unit 3094 derives weighted prediction coefficients w0, w1, o0, and o1 from the coded data, and performs processing in accordance with the equation below.

Pred[x][y] = Clip3(0, (1<<bitDepth)−1, ((PredL0[x][y]*w0+PredL1[x][y]>*w1+((o0+o1+1)<<log2WD))>>(log2WD+1))

The inter-prediction image generation unit 309 outputs the generated prediction image of the block to the addition unit 312.

Intra-Prediction Image Generation Unit

In a case that predMode indicates an intra-prediction mode, the intra-prediction image generation unit performs intra-prediction by using an intra-prediction parameter input from the intra-prediction parameter derivation unit and a reference pixel read out from the reference picture memory 306.

The inverse quantization and inverse transform processing unit 311 performs inverse quantization on a quantized transform coefficient input from the parameter decoder 302 to calculate a transform coefficient.

Inverse Quantization and Inverse Transform

Figure 20:
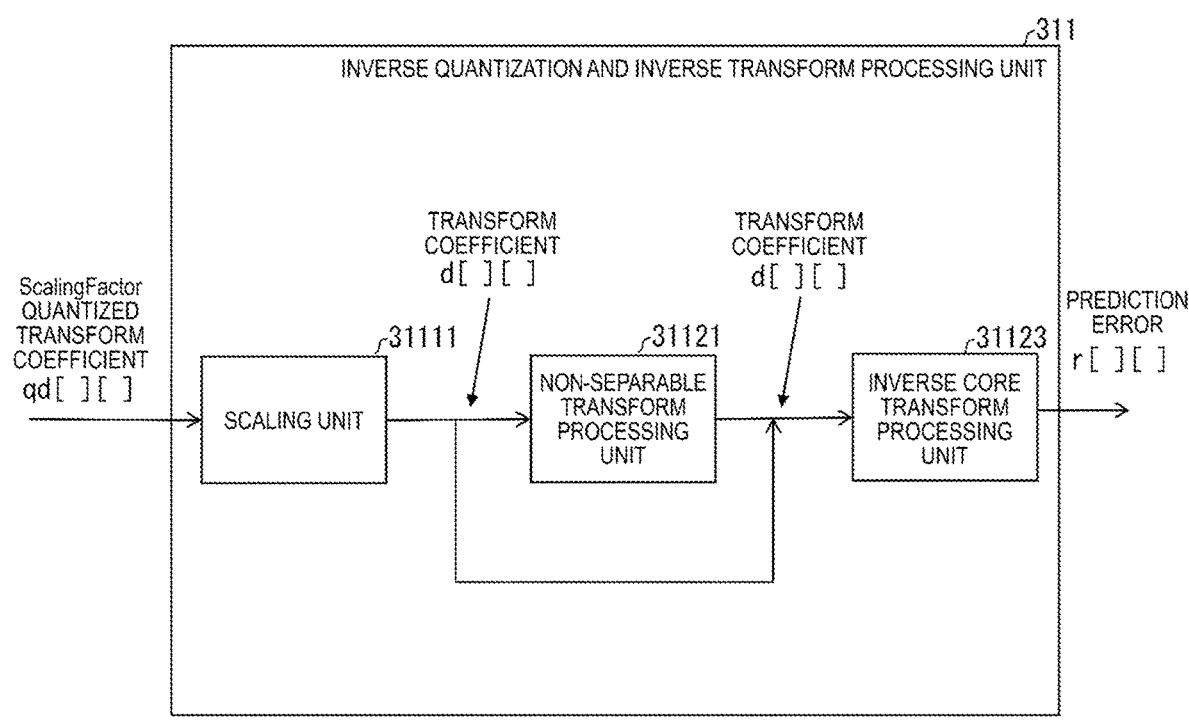
FIG. 20 is a functional block diagram illustrating a configuration example of an inverse quantization and inverse transform processing unit.

FIG. 20 is a block diagram illustrating a configuration of the inverse quantization and inverse transform processing unit 311 according to the present embodiment. The inverse quantization and inverse transform processing unit 311 includes a scaling unit 31111, an inverse non-separable transform processing unit 31121, and an inverse core transform processing unit 31123.

The inverse quantization and inverse transform processing unit 311 scales (inverse-quantizes) the quantized transform coefficient qd[ ][ ] input from the entropy decoder 301 to obtain a transform coefficient d[ ][ ] by using the scaling unit 31111. The quantized transform coefficient qd[ ][ ] is a coefficient obtained by performing transform such as Discrete Cosine Transform (DCT) and Discrete Sine Transform (DST) on a prediction error and quantizing the transformed prediction error or a coefficient obtained by further performing non-separable transform on the transformed coefficient in a coding processing. In a case that lfnst_idx!=0, the inverse quantization and inverse transform processing unit 311 performs inverse transform by using the inverse non-separable transform processing unit 31121. Inverse frequency transform such as inverse DCT and inverse DST is further performed on the transform coefficient, and the prediction error is calculated. In addition, in a case that lfnst_idx==0, an inverse transform such as inverse DCT and inverse DST is performed on the transform coefficient scaled by the scaling unit 31111, without causing the inverse non-separable transform processing unit 31121 to perform, and the prediction error is calculated. The inverse quantization and inverse transform processing unit 311 outputs the prediction error to the addition unit 312.

Further, the inverse transform and the transform are paired processing, and thus the transform and the inverse transform may be interpreted as being replaced with each other. Alternatively, the transform may be referred to as forward transform in a case that the inverse transform is referred to as a transform. For example, the non-separable transform may be referred to as a forward non-separable transform in a case that the inverse non-separable transform is referred to as a non-separable transform. In addition, the core transform is simply referred to as a transform.

d[x][y] is transmitted to the inverse core transform processing unit 31123 or the inverse non-separable transform processing unit 31121. The inverse non-separable transform processing unit 31121 applies the inverse non-separable transform to the transform coefficient d[ ][ ] after the inverse quantization and before the core transform.

Non-Separable Transform

The inverse non-separable transform is applied to transform coefficients of a part or the entire region of a TU in the video decoding apparatus 31. After the inverse non-separable transform is applied, an inverse separable transform (such as DCT2 and DST7) is applied to the transform coefficients after the inverse non-separable transform. Furthermore, in a case that a TU is divided into 4×4 subblocks, a non-separable transform and an inverse non-separable transform are applied only to the predetermined top-left subblock. Examples of sizes of a TU in which one of the width W and the height H of the TU is 4 include 4×4, 8×4, 4×8, L×4, and 4×L (L is a natural number of 16 or greater).

In addition, a technique for transmitting only some low-frequency components in transform coefficients after a separable transform is called Reduced Secondary Transform (RST) or Low Frequency Non-Separable Transform (LFNST). In particular, in a case that the number of transform coefficients of the non-separable transform to be transmitted nonZeroSize is less than or equal to the size of a separable transform ((1<<log 2StSize)×(1<<log 2StSize)), it is called LFNST. Further, a transform adapted to errors in the case of GPM prediction is referred to as a GPM non-separable transform (or GPM_LFNST) in the present specification. The inverse non-separable transform processing will be described below in order.

(S2000: Decoding of Non-Separable Transform Index)

FIG. 22 and FIG. 23 are examples of a syntax table showing flags of non-separable transforms. FIG. 22 shows an example in which lfnst_idx and mtx_idx are signaled in a CU, and FIG. 23 shows an example in which lfnst_idx and mtx_idx are signaled in a TU.

The TU decoder 3024 decodes an index mts_idx indicating a transformation matrix of a separable transform from the coded data. mts_idx may be decoded after lfnst_idx, and mtx_idx may be decoded only in a case that lfnst_idx is zero (0). That is, only in a case that no non-separable transform is used (lfnst_idx is zero (0)), a configuration in which a transformation matrix other than DCT2 indicated by mtx_idx!=0 may be used.

In addition, the TU decoder 3024 decodes an index lfnst_idx from coded data. lfnst_idx is an index indicating whether a non-separable transform is used and a transformation matrix. The TU decoder 3024 derives a flag LfnstDcOnly and a flag LfnstZeroOutSigCoeffFlag. LfnstDcOnly is a flag indicating whether the transform coefficient is DC-only, and LfnstZeroOutSigCoeffFlag is a flag indicating whether a transform coefficient exists in a predetermined high-frequency region (zero-out region). The TU decoder 3024 decodes lfnst_idx in a case that LfnstDcOnly==0 and LfnstZeroOutSigCoeffFlag==1. Here, LfnstDcOnly==0 indicates that there are transform coefficients other than a DC coefficient. LfnstZeroOutSigCoeffFlag==1 indicates that there is no non-zero transform coefficient in the zero-out region. Before the residual of the TU is decoded, LfnstDcOnly=1 and LfnstZeroOutSigCoeffFlag=1 are set. In a case that the position of the last coefficient is other than DC (lastSubBlock==0 && lastScanPos>0), LfnstDcOnly=0 is set. In a case that the last position is in a high frequency region, LfnstZeroOutSigCoeffFlag=0 is set. The case that the last position is in the high frequency region is, for example, a case that (lastScanPos>7 && (log 2TbWidth==2||log 2TbWidth==3) is satisfied. In a case that lfnst_idx is not decoded, lfnst_idx=0 is set. Further, in a case that an intra sub-partition tool is on (IntraSubPartitionsSplitType!=ISP_NO_SPLIT) or (LfnstDcOnly==0 and LfnstZeroOutSigCoeffFlag==1), lfnst_idx may be decoded. In addition, in a case that lfnst_idx is decoded, the width and height of a CU may be limited to 4 or greater, or MIP prediction in small blocks may be excluded (block sizes may be limited to a predetermined size or greater).

In a case that the prediction mode is the intra-prediction mode and sps_lfnst_enabled_flag is 1 (SYN_LFNST_INTRA) or a case that the prediction mode is inter and sps_gpm_lfnst_enabled_flag is 1 (SYN_GPM_INTRA), the TU decoder 3024 decodes lfnst_idx. Further, lfnst_idx being 0 indicates a non-separable transform is not applied, lfnst_idx being 1 indicates one transform in a set (pair) of non-separable transformation matrices is applied, and lfnst_idx being 2 indicates a transform of the other transform in the pair is applied.

In addition, in a case that the prediction mode is inter and the GPM non-separable transform is used, that is, in a case that the GPM non-separable transform is applied to the inter-CU, only one of the sets (pairs) of non-separable transformation matrices is used. The value of lfnst_idx may be limited to {0, 1} or {0, 2}, thereby reducing the cost of the flags needed in a case of adapting a GPM non-separable transform to inter-CUs.

To be more specific, in a case of decoding the syntax elements indicating whether to use the non-separable transform, the TU decoder 3024 decodes lfnst_idx having three values {0, 1, 2} or more in a case that the prediction mode is intra-prediction. Otherwise (in a case that the prediction mode is inter-prediction, here, GPM prediction), lfnst_flag of two values {0, 1} may be decoded. In the following processing, lfnst_idx=lfnst_flag is handled. Different contexts may be used for lfnst_idx and lfnst_flag which are switched according to the prediction mode.

In addition, the TU decoder 3024 may decode lfnst_flag first, and in a case that the prediction mode is intra-prediction, the TU decoder 3024 may further decode lfnst_set_flag. lfnst_set_flag is a flag or index indicating the type of a non-separable transform. Otherwise (in a case that the prediction mode is inter-prediction, here a GPM prediction), lfnst_set_flag is not decoded from coded data, and lfnst_set_flag=0 is inferred. In the subsequent processing, lfnst_idx=lfnst_flag+lfnst_set_flag is handled.

In addition, although the TU decoder 3024 decodes lfnst_idx regardless of the prediction mode, the binarization may be changed according to the prediction mode. For example, in a case that the prediction mode is intra-prediction, a Truncated Rice code (TR code) having a maximum value cmax=2 and a Rice parameter cRiceParam=0 may be used as binarization to decode lfnst_idx in a range of values from 0 to 2. In a case that the prediction mode is inter-prediction (here, GPM prediction), a TR code with a maximum value cmax=1 and a Rice parameter cRiceParam=0 may be used as binarization to decode lfnst_idx in a range of values from 0 to 1. Furthermore, a truncated unary code may be used instead of the TR code.

Furthermore, the context index cIdx (or the context index difference ctxInc) of lfnst_idx, lfnst_flag, and lfnst_set_flag may be changed according to the prediction mode. cIdx is an index used to store a probability parameter used in arithmetic codes. For example, it is derived as ctxIdx (or ctxInc)= (CuPredMode [chType] [xTb] [yTb]==MODE_INTRA)?0: 1.

Derivation of Transformation Matrix

The inverse non-separable transform processing unit 31121 derives a transformation matrix secTransMatrix [ ][ ] used in transform processing.

To be more specific, in a case that the prediction mode is intra-prediction, the inverse non-separable transform processing unit 31121 derives lfnstTrSetId from the intra-prediction mode IntraPredMode. In a case that the prediction mode is the inter-prediction, lfnstTrSetId is derived from the size of the block or the angle index angleIdx of the GPM (or the mode number merge_gpm_partition_idx of the GPM). lfnstTrSetId is a number indicating a set of transformation matrices of a non-separable transform. Further, a transformation matrix (or a set of transformation matrices) corresponding to lfnstTrSetId=K is hereinafter referred to as MK.

In the non-separable transform, multiple predetermined transformation matrices can be used, and a suitable transform can be performed by selecting an appropriate transformation matrix from the intra-prediction mode and the GPM mode.

FIG. 14 is a table used to select a transformation matrix of a non-separable transform in an intra-prediction mode. The inverse non-separable transform processing unit 31121 derives a matrix of the non-separable transform, here, a set number (lfnstTrSetId) of a transformation matrix, from the intra-prediction mode predModeIntra using the table of FIG. 14. In a case that the table is an array of nstSetTableIntra, the following look-up table may be used to derive lfnstTrSetId.

---
lfnstTrSetIdx = nstSetTableIntra[IntraPredMode]
nstSetTableintra[ ] = {2, 2, 3, 3, 3, 3, 3, 3, 2, 2, 2, 1, 1, 1, 1, 1, 2, 2, 2,, 3, 3, 3, 3, 2, 2, 2, 1, 1, 1, 1, 1, 2}
---

The following example describes processing using a look-up table.

FIG. 15 is a table used to derive a transformation matrix for a non-separable transform in the GPM mode. In a case that the prediction mode is the inter-prediction and the GPM prediction, the inverse non-separable transform processing unit 31121 derives the set number (lfnstTrSetIdx) of the non-separable transform from the angle index angleIdx using the table nstSetTableGPMangle1.

---
lfnstTrSetIdx = nstSetTableGPMangle1[angleIdx]
nstSetTableGPMangle1[ ] = {2, 2, 3, 3, 3, 3, 3, 3, 2, 2, 2, 1, 1, 1, 1, 1, 2, 2, 2, , 3, 3, 3, 3, 3, 2, 2, 2, 1, 1, 1, 1, 1, 2}
---

That is, in the GPM, a range A of 33.75 corresponding to the triple of 11.25 degrees and a range B of 11.25*5 that is equal to 56.25 degrees are set as a unit, and are allocated to A, B, A, B, A, B, A, and B, (M2, M3, M2, M1, M2, M3, M2, and M1 in a matrix). 11.25 degrees is an angle obtained by dividing 360 degrees by 32. The range of A is used around horizontal and vertical (angleIdx=0, 8, 16, 24) and the same transformation matrix M2 is used. The range of B is a different transformation matrix for each range shifted by 90 degrees. Here, M3 and M1 are used. The same transformation matrix is used for the range shifted by 180 degrees (angle shifted by 180 degrees). That is, in a case that the absolute difference of angleIdx is a difference of 180° (16 in this case), the same value is used for lfnstTrSetIdx.

FIG. 16 is another example of a table for deriving lfnstTrSetIdx from the angle index angleIdx in the GPM mode. lfnstTrSetId is allocated in units of four values of angleIdx, that is, the range of 45 degrees obtained by summing four 11.25 degrees.

---
nstSetTableGPMangle2[ ] = {0, 0, 0, 0, 1, 1, 1, 1, 0, 0, 0, 0, 1, 1, 1, 1,
  0, 0, 0, 0, 1, 1, 1, 1, 0, 0, 0, 0, 1, 1, 1, 1}
---

In addition, the start position of the unit is not limited to angleIdx=0, and the following table in which the start position is shifted may be used.

---
nstSetTableGPMangle2[ ] = {0, 0, 0, 1, 1, 1, 1, 1, 0, 0, 0, 0, 1, 1, 1, 1, 0,
  0, 0, 0, 1, 1, 1, 1, 0, 0, 0, 0, 1, 1, 1, 1, 0}
nstSetTableGPMangle2[ ] = {0, 0, 1, 1, 1, 1, 0, 0, 0, 0, 1, 1, 1, 1, 0, 0,
  0, 0, 1, 1, 1, 1, 0, 0, 0, 0, 1, 1, 1, 1, 0, 0}
nstSetTableGPMangle2[ ] = {0, 1, 1, 1, 1, 0, 0, 0, 0, 1, 1, 1, 1, 0, 0, 0,
  0, 1, 1, 1, 1, 0, 0, 0, 0, 1, 1, 1, 1, 0, 0, 0}
---

In the above, the transformation matrices are the same in the cases that a 90-degree shift is made (a difference of angleIdx is 8).

As shown in another example of FIG. 16, lfnstTrSetId is allocated in units of two values of angleIdx, that is, the range of 22.5 degrees obtained by summing two 11.25 degrees. In this case, the transformation matrices are in the cases that a 90-degree shift is made.

---
nstSetTableGPMangle3[ ] = {0, 0, 1, 1, 2, 2, 3, 3, 0, 0, 1, 1, 2, 2, 3, 3,
  0, 0, 1, 1, 2, 2, 3, 3, 0, 0, 1, 1, 2, 2, 3, 3}
---

In addition, the following table in which positions are shifted may be used.

---
nstSetTableGPMangle3[ ] = {0, 1, 1, 2, 2, 3, 3, 0, 0, 1, 1, 2, 2, 3, 3, 0,
  0, 1, 1, 2, 2, 3, 3, 0, 0, 1, 1, 2, 2, 3, 3, 0}
---

In the above, the transformation matrices are the same in the cases that a 90-degree shift is made (a difference of angleIdx is 8).

FIG. 17 is another example of a table for deriving lfnstTrSetIdx from the angle index angleIdx in the GPM mode. lfnstTrSetId is allocated in units of four values of angleIdx, that is, the range of 45 degrees obtained by summing four 11.25 degrees.

---
nstSetTableGPMangle4[ ] = {0, 0, 0, 0, 1, 1, 1, 1, 2, 2, 2, 2, 3, 3, 3, 3,
  0, 0, 0, 0, 1, 1, 1, 1, 2, 2, 2, 2, 3, 3, 3, 3}
---

In addition, the start position of the unit is not limited to angleIdx=0, and the following table in which the start position is shifted may be used.

---
nstSetTableGPMangle4[ ] = {0, 0, 0, 1, 1, 1, 1, 2, 2, 2, 2, 3, 3, 3, 3, 0,
  0, 0, 0, 1, 1, 1, 1, 2, 2, 2, 2, 3, 3, 3, 3, 0}
nstSetTableGPMangle4[ ] = {0, 0, 1, 1, 1, 1, 2, 2, 2, 2, 3, 3, 3, 3, 0, 0,
  0, 0, 1, 1, 1, 1, 2, 2, 2, 2, 3, 3, 3, 3, 0, 0}
nstSetTableGPMangle4[ ] = {0, 1, 1, 1, 1, 2, 2, 2, 2, 3, 3, 3, 3, 0, 0, 0,
  0, 1, 1, 1, 1, 2, 2, 2, 2, 3, 3, 3, 3, 0, 0, 0}
---

In the above, the transformation matrices are the same in the cases that a 180-degree shift is made (a difference of angleIdx is 16).

In addition, as shown in another example of FIG. 17, lfnstTrSetId may be allocated in units of two values of angleIdx, that is, the range of 22.5 degrees obtained by summing two 11.25 degrees.

nstSetTableGPMangle5[ ] = {0, 0, 1, 1, 2, 2, 3, 3, 4, 4, 5, 5, 6, 6, 7, 7, 0, 0, 1, 1, 2, 2, 3, 3, 4, 4, 5, 5, 6, 6, 7, 7}

In addition, the following table in which positions are shifted may be used.

nstSetTableGPMangle5[ ] = {0, 1, 1, 2, 2, 3, 3, 4, 4, 5, 5, 6, 6, 7, 7, 0, 0, 1, 1, 2, 2, 3, 3, 4, 4, 5, 5, 6, 6, 7, 7, 0}

In the above, the transformation matrices are the same in the cases that a 180-degree shift is made (a difference of angleIdx is 16).

FIG. 18 is a table used to derive a transformation matrix for a non-separable transform in the GPM mode. In a case that the prediction mode is the inter-prediction and the GPM prediction, the inverse non-separable transform processing unit 31121 derives the set number (lfnstTrSetId) of the non-separable transform from the split information merge_gpm_partition_idx of the GPM using the table nstSetTableGPMangleS. Here, 0 to 3 are used as lfnstTrSetId for intra-prediction, and 4 to 6 are used as lfnstTrSetId for inter-prediction (here, GPM).

nstSetTableGPMangleS[ ] = {5, 5, 6, 6, 6, 6, 6, 5, 5, 5, 4, 4, 4, 4, 5, 5, 5, 6, 6, 6, 6, 6, 6, 5, 5, 5, 4, 4, 4, 4, 5, 5}

In the above-described configuration, by using different transformation matrices according to the mode number of intra-prediction and the angle indices of inter-prediction, the effect of efficient coding can be exhibited.

FIG. 19 is a table used to derive a transformation matrix for a non-separable transform in the GPM mode. In a case that the prediction mode is the inter-prediction and the GPM prediction, the inverse non-separable transform processing unit 31121 derives the set number (lfnstTrSetId) of the non-separable transform from the split information merge_gpm_partition_idx of the GPM using the table nstSetTableGPMpart.

lfnstTrSetId = nstSetTableGPMpart[merge_gpm_partition_idx]

The inverse non-separable transform processing unit 31121 derives the transformation matrix secTranMatrix [ ][ ] from the set number (lfnstTrSetId) of the non-separable transform, lfnst_idx indicating the transformation matrix of the non-separable transform, and the non-separable transform size nStSize (nTrS).

The prediction image generated from the GPM has directionality indicated by angleIdx of the GPM, and the same directionality may remain in the residual of the GPM. According to the above configuration, in a case that the GPM mode is used, the transform coefficients of the residual can be further concentrated in the low frequency region by the non-separable transform using the directionality of the division pattern of the GPM. Therefore, the effect of improvement in coding efficiency is exhibited.

(S2201: Configuration of Conversion Size and Input/Output Size)

In the inverse non-separable transform, the size (4×4 or 8×8) of the inverse non-separable transform, the number of output transform coefficients, the number of transform coefficients to be applied, and the number of subblocks to which the inverse non-separable transform is to be applied are derived according to the size (width W and height H) of the TU. The sizes of the inverse non-separable transforms of 4×4 and 8×8 are indicated by nStSize=4 and 8. In addition, the sizes of the inverse non-separable transforms of 4×4 and 8×8 may also be referred to as RST 4×4 and RST 8×8, respectively. In the following, nStOutSize represents the number of output transform coefficients, nonZeroSize represents the number of transform coefficients to be applied (input transform coefficients), and numStX and numStY represent the number of subblocks to which the inverse non-separable transform is applied.

In the inverse non-separable transform, in a case that the TU is equal to or larger than a predetermined size, 48 transform coefficients are output by the RST 8×8 inverse non-separable transform. Otherwise, 16 transform coefficients are output by the RST 4×4 inverse non-separable transform. In a case that the TU is 4×4, 16 transform coefficients are derived from 8 transform coefficients by using RST 4×4, and in a case that the TU is 8×8, 48 transform coefficients are derived from 8 transform coefficients by using RST 8×8. In other cases, 16 or 48 transform coefficients are output from 16 transform coefficients depending on the size of the TU.

In a case that W and H are both 8 or greater, log 2StSize=3 and nStOutSize=48

Otherwise, log 2StSize=2 and nStOutSize=16 nStSize=1<<log 2StSize

In a case that both W and H are 4 or 8×8, nonZeroSize=8.

Otherwise, nonZeroSize=16

Further, input nonZeroSize of LFNST is not limited to 8 and 16. For example, it may be 12 or the like. The output nStOutSize is not limited to 16 and 48 either, and may be 32, 36, 64 or the like.

numStX = (nTbH == 4 && nTbW > 8) ? 2 : 1
numStY = (nTbW == 4 && nTbH > 8) ? 2 : 1

Further, numStX=numStY may always be set without performing a non-separable transform on multiple subblocks.

(S2202: Rearrangement in One Dimensional Array)

The inverse non-separable transform processing unit 31121 once rearranges a transform coefficient d [ ][ ] of a part of the TU in a one-dimensional array u [ ] for processing. To be more specific, the inverse non-separable transform processing unit 31121 derives u [ ] from the two-dimensional transform coefficient d [ ][ ] of the target TU indicated by a region RU with reference to the transform coefficient of x=0 . . . nonZeroSize−1. xC and yC are positions on the TU, and are derived from the array DiagScanOrder indicating the scan order and the position x of the array u [ ].

```
xC = (xSbIdx<<log2StSize) + DiagScanOrder[log2StSize][log2StSize][x][0]
yC = (ySbIdx<<log2StSize) + DiagScanOrder[log2StSize][log2StSize][x][1]
u[x] = d[xC][yC]
```

Further, a range copied in the one-dimensional array is referred to as a region RU.

(S2203: Application of Transform Processing)

The inverse non-separable transform processing unit 31121 transforms u [ ] having a length of nonZeroSize using a transformation matrix secTransMatrix [ ][ ], and derives a coefficient v'[ ] of a one-dimensional array having a length of nStOutSize as an output.

Furthermore, the inverse non-separable transform processing unit 31121 performs a product-sum operation of the transformation matrix and the one-dimensional variable u [ ] as indicated in the following expression.

```
v[i] = Clip3(CoeffMin, CoeffMax, Σ (secTransMatrix[i][j]*u[j]+64)>>7)
```

Here, Σ is the sum up to j=0 . . . nonZeroSize−1. In addition, i performs processing on 0 . . . nStSize−1. CoeffMin and CoeffMax indicate the ranges of the transform coefficient values.

(S2204: Two-Dimensional Arrangement of One-Dimensional Array after Transform Processing)

The inverse non-separable transform processing unit 31121 arranges the transform coefficient v' [ ] of the transformed one-dimensional array at a predetermined position in the TU again. The arrangement method may be changed according to predModeIntra.

Specifically, in a case of predModeIntra<=34, the following processing may be applied.

```
d[x][y] = (y<4) ? v[x+(y<<log2StSize)] : ((x<4) ?
    v[32+x+((y−4)<<2)] : d[x][y])
```

Otherwise, the following formula is applied.

```
d[x][y] = (x<4) ? v[y+(x<<log2StSize)] : ((y<4) ? v[32+y+((x−4)
<< 2)] : d[x] [y])
```

In addition, the above-described determination of branching may be "predModeIntra<=34" or "predModeIntra==INTRA_LT_CCLM" or "INTRA_T_CCLM or INTRA_L_CCLM".

Details of Non-Separable Transform Processing

Figure 24:
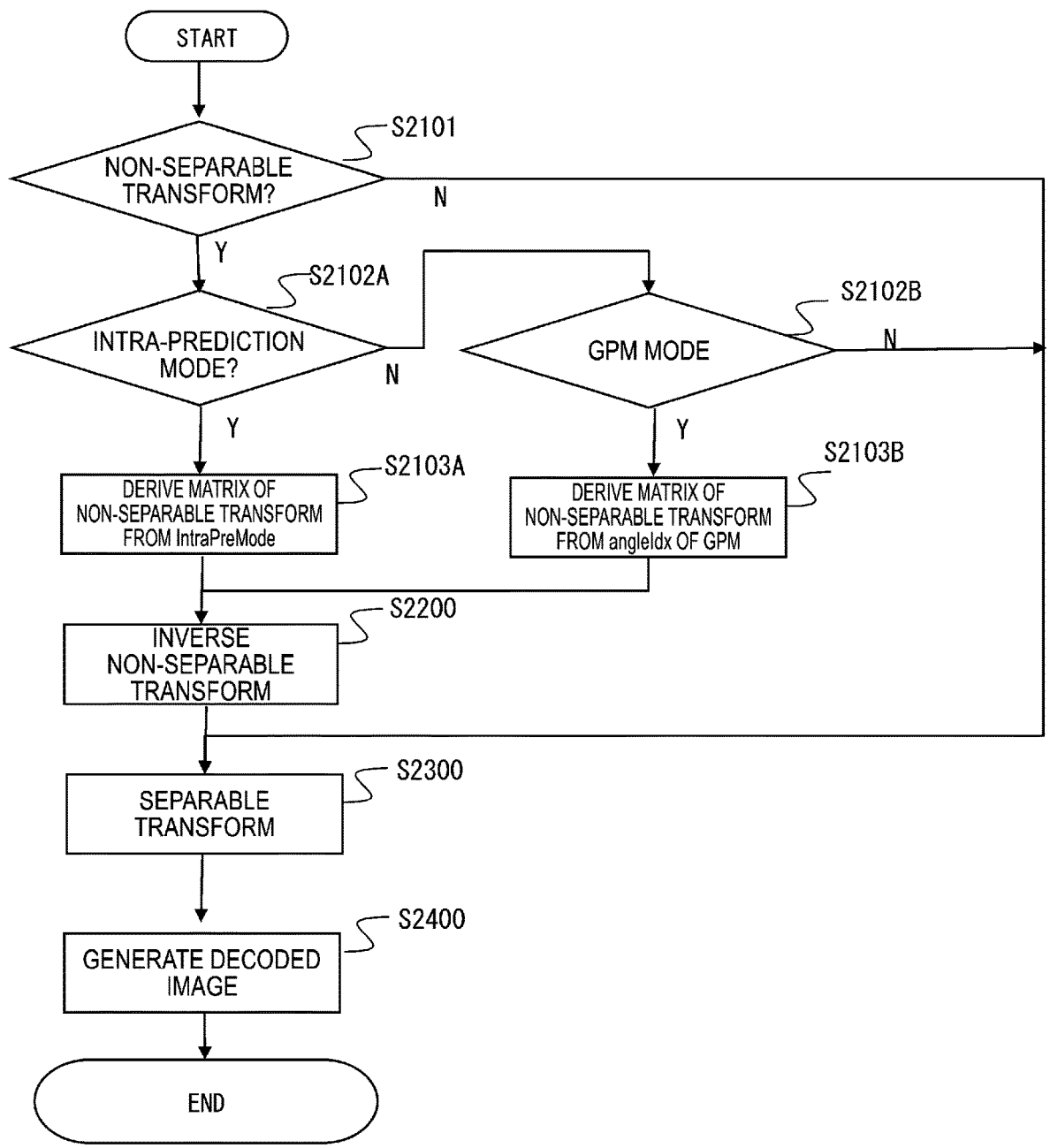
FIG. 24 is a flowchart illustrating a processing flow in a case that a non-separable transform is performed in the GPM.

FIG. 24 is a flowchart illustrating a processing flow in a case that a non-separable transform is performed in the GPM.

(S2101) In a case that a non-separable transform is used (lfnst_idx!=0), the processing transitions to S2102A. Otherwise, the non-separable transform is skipped, and a transition is made to S2300 to perform a separable transform.

(S2102A) In the case of the intra-prediction mode, a transition is made to S2103A, lfnstTrSetId is derived from IntraPredMode, and the transformation matrix secTranMatrix [ ][ ] is derived from lfnstTrSetId and the block size.

(S2102B) In a case that the prediction mode is not the intra-prediction mode (GPM mode), a transition is made to S2102B, lfnstTrSetId is derived from angleIdx, and the transformation matrix secTranMatrix [ ][ ] is derived from lfnstTrSetId and the block size. Further, in a case that the non-separable transform being performed (lfnst_idx!=0) is only the intra-prediction mode or the GPM mode, it has been confirmed that the mode is the GPM mode in a case that the mode is not the intra-prediction mode, and thus the determination of S2102B can be skipped.

(S2200) A non-separable transform is performed by using the transformation matrix secTranMatrix[ ][ ]. Specifically, the above-described processing of S2201 to S2204 may be performed.

(S2300) A separable transform is further performed on the transform coefficient that has been subjected to a non-separable transform.

The addition unit 312 adds the prediction image of the block input from the prediction image generation unit 308 and the prediction error input from the inverse quantization and inverse transform processing unit 311 for each pixel, and generates a decoded image of the block. The addition unit 312 stores the decoded image of the block in the reference picture memory 306, and also outputs it to the loop filter 305.

Configuration of Video Coding Apparatus

Figure 7:
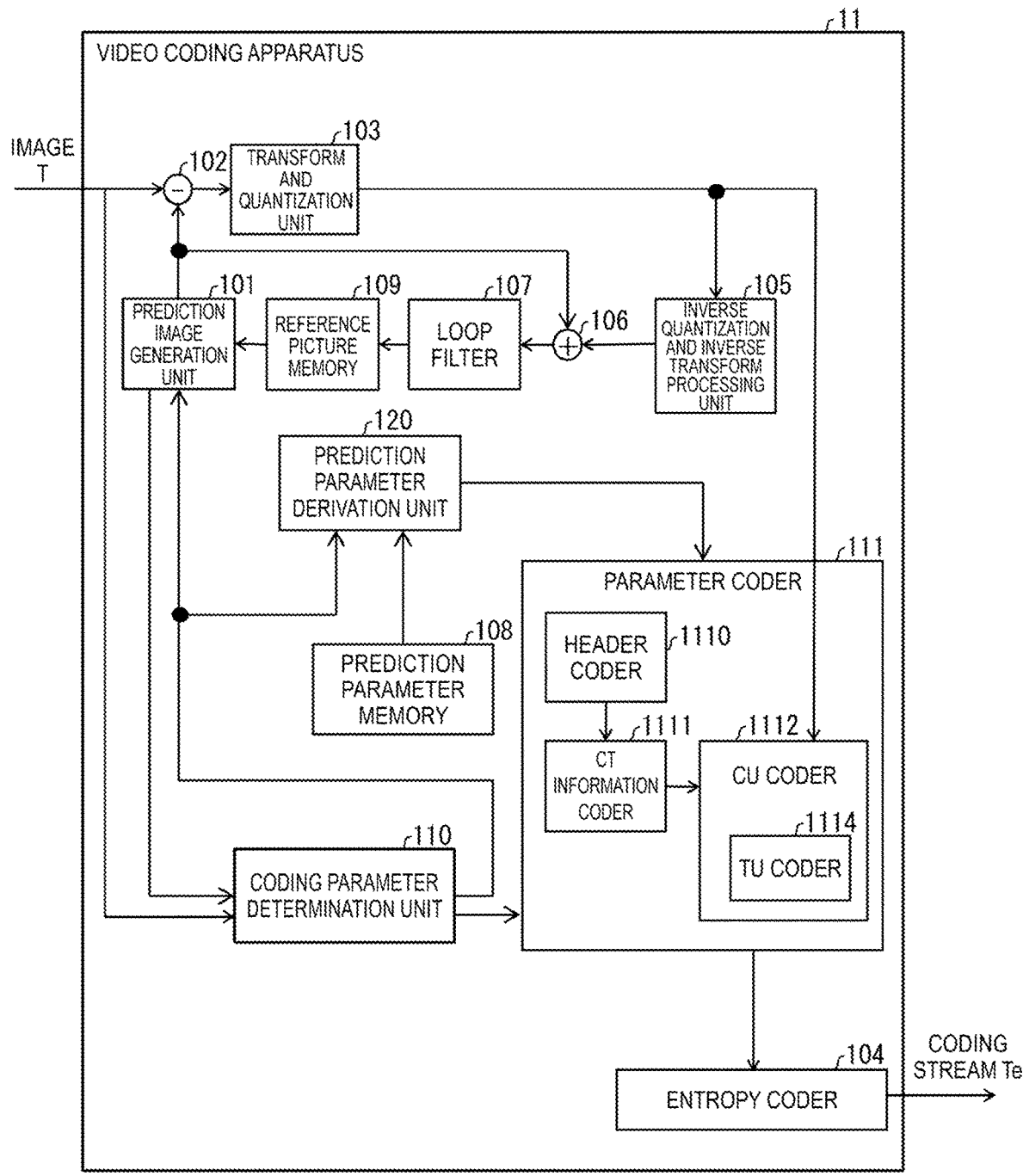
FIG. 7 is a block diagram illustrating a configuration of a video coding apparatus.

Next, a configuration of the video coding apparatus 11 according to the present embodiment will be described. FIG. 7 is a block diagram illustrating a configuration of the video coding apparatus 11 according to the present embodiment. The video coding apparatus 11 includes a prediction image generation unit 101, a subtraction unit 102, a transform and quantization unit 103, an inverse quantization and inverse transform processing unit 105, an addition unit 106, a loop filter 107, a prediction parameter memory (a prediction parameter storage unit or a frame memory) 108, a reference picture memory (a reference image storage unit or a frame memory) 109, a coding parameter determination unit 110, a parameter coder 111, a prediction parameter derivation unit 120, and an entropy coder 104.

The prediction image generation unit 101 generates a prediction image for each CU. The prediction image generation unit 101 includes the inter-prediction image generation unit 309 and intra-prediction image generation unit already described, and description of these units is omitted.

The subtraction unit 102 subtracts a pixel value of a prediction image of a block input from the prediction image generation unit 101 from a pixel value of an image T to generate a prediction error. The subtraction unit 102 outputs the prediction error to the transform and quantization unit 103.

The transform and quantization unit 103 performs a frequency transform on the prediction error input from the subtraction unit 102 to calculate a transform coefficient, and derives a quantized transform coefficient by quantization. The transform and quantization unit 103 outputs the quantized transform coefficient to the parameter coder 111 and the inverse quantization and inverse transform processing unit 105.

The inverse quantization and inverse transform processing unit 105 is the same as the inverse quantization and inverse transform processing unit 311 of the video decoding apparatus 31, and descriptions thereof are omitted. The calculated prediction error is output to the addition unit 106.

The parameter coder 111 includes a header coder 1110, a CT information coder 1111, and a CU coder 1112 (prediction mode coder). The CU coder 1112 further includes a TU coder 1114. A general operation of each module will be described below.

The header coder 1110 performs coding processing of parameters such as header information, split information, prediction information, and quantized transform coefficients. The CT information coder 1111 codes QT and MT (BT and TT) split information and the like.

The CU coder 1112 codes CU information, prediction information, split information, and the like.

In a case that a prediction error is included in a TU, the TU coder 1114 codes QP update information and a quantization prediction error.

The CT information coder 1111 and the CU coder 1112 supplies, to the parameter coder 111, syntax elements such as the inter-prediction parameters (predMode, merge_flag, merge_idx, inter_pred_idc, refIdxLX, mvp_LX_idx, and mvdLX), the intra-prediction parameters, and the quantized transform coefficients.

The parameter coder 111 inputs the quantized transform coefficients and the coding parameters (split information and prediction parameters) to the entropy coder 104. The entropy coder 104 entropy-codes the quantized transform coefficients and the coding parameters to generate and output a coding stream Te.

The prediction parameter derivation unit 120 is a section including the inter-prediction parameter coder 112 and the intra-prediction parameter coder, and derives an intra-prediction parameter and an intra-prediction parameter from the parameters input from the coding parameter determination unit 110. The derived intra-prediction parameter and intra-prediction parameter are output to the parameter coder 111.

Configuration of Inter-Prediction Parameter Coder

Figure 8:
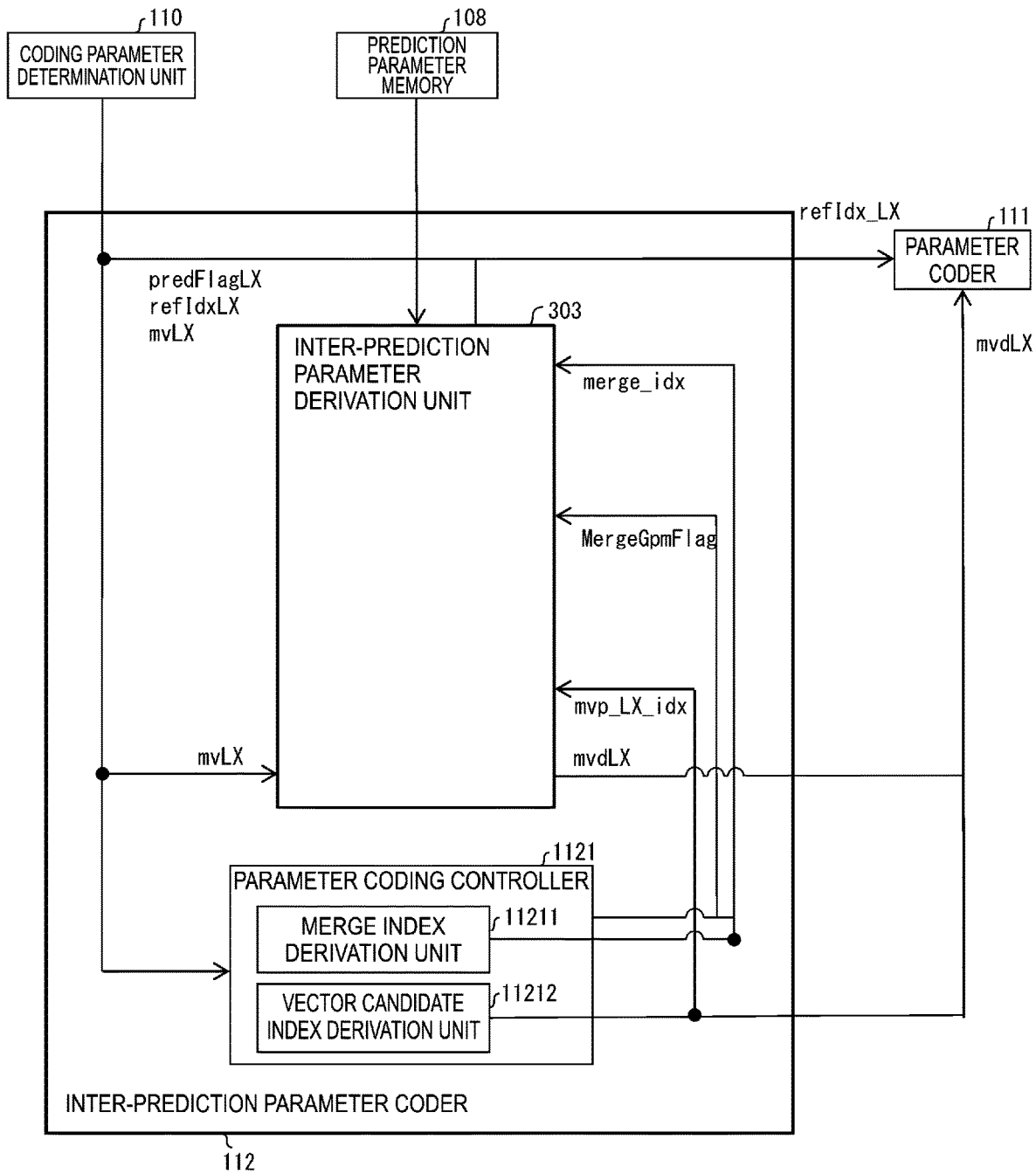
FIG. 8 is a schematic diagram illustrating a configuration of an inter-prediction parameter coder.

The inter-prediction parameter coder 112 includes a parameter coding controller 1121 and an inter-prediction parameter derivation unit 303 as illustrated in FIG. 8. The inter-prediction parameter derivation unit 303 has a configuration common to the video decoding apparatus. The parameter coding controller 1121 includes a merge index derivation unit 11211 and a vector candidate index derivation unit 11212.

The merge index derivation unit 11211 derives merge candidates and the like, and outputs the merge candidates and the like to the inter-prediction parameter derivation unit 303. The vector candidate index derivation unit 11212 derives prediction vector candidates and the like, and outputs the prediction vector candidates and the like to the inter-prediction parameter derivation unit 303 and the parameter coder 111.

Configuration of Intra-Prediction Parameter Coder

The intra-prediction parameter coder includes a parameter coding controller and an intra-prediction parameter derivation unit. The intra-prediction parameter derivation unit has a configuration common to the video decoding apparatus.

However, unlike in the video decoding apparatus, the coding parameter determination unit 110 and the prediction parameter memory 108 provide input to the inter-prediction parameter derivation unit 303 and the intra-prediction parameter derivation unit, and the input is output to the parameter coder 111.

The addition unit 106 adds together, for each pixel, a pixel value of a prediction block input from the prediction image generation unit 101 and a prediction error input from the inverse quantization and inverse transform processing unit 105 to generate a decoded image. The addition unit 106 stores the generated decoded image in the reference picture memory 109.

The loop filter 107 applies a deblocking filter, an SAO, and an ALF to the decoded image generated by the addition unit 106.

The prediction parameter memory 108 stores the prediction parameters generated by the coding parameter determination unit 110 for each target picture and CU at a predetermined position.

The reference picture memory 109 stores the decoded image generated by the loop filter 107 for each target picture and CU at a predetermined position.

The coding parameter determination unit 110 selects one set among multiple sets of coding parameters. The coding parameters include QT, BT, or TT split information described above, a prediction parameter, or a parameter to be coded which is generated related thereto. The prediction image generation unit 101 generates a prediction image by using these coding parameters.

The coding parameter determination unit 110 calculates, for each of the multiple sets, an RD cost value indicating the magnitude of an amount of information and a coding error. The RD cost value is, for example, the sum of a code amount and the value obtained by multiplying a coefficient $\lambda$ by a square error. The code amount is an amount of information of the coding stream Te obtained by performing entropy coding on a quantization error and a coding parameter. The square error is the square sum of the prediction errors calculated in the subtraction unit 102. The coefficient $\lambda$ is a real number greater than a preset zero. The coding parameter determination unit 110 selects a set of coding parameters of which the calculated cost value is a minimum value. The coding parameter determination unit 110 outputs the determined coding parameters to the parameter coder 111 and the prediction parameter derivation unit 120.

Further, a computer may be used to implement some of the video coding apparatus 11 and the video decoding apparatus 31 in the above-described embodiments, for example, the entropy decoder 301, the parameter decoder 302, the loop filter 305, the prediction image generation unit 308, the inverse quantization and inverse transform processing unit 311, the addition unit 312, the prediction image generation unit 101, the subtraction unit 102, the transform and quantization unit 103, the entropy coder 104, the inverse quantization and inverse transform processing unit 105, the loop filter 107, the coding parameter determination unit 110, the parameter coder 111, and the prediction parameter derivation unit 120. In that case, this configuration may be realized by recording a program for realizing such control functions on a computer-readable recording medium and causing a computer system to read and perform the program recorded on the recording medium. Further, the "computer system" described here refers to a computer system built into either the video coding apparatus 11 or the video decoding apparatus 31 and is assumed to include an OS and hardware components such as a peripheral apparatus. A "computer-readable recording medium" refers to a portable medium such as a flexible disk, a magneto-optical disk, a ROM, and a CD-ROM, and a storage apparatus such as a hard disk built into the computer system. Moreover, the "computer-readable recording medium" may include a medium that dynamically stores a program for a short period of time, such as a communication line in a case that the program is transmitted over a network such as the Internet or over a communication line such as a telephone line, and may also include a medium that stores the program for a certain period of time, such as a volatile memory included in the computer system functioning as a server or a client in such a case. The above-described program may be one for implementing a part of the above-described functions, and also may be one capable of implementing the above-described functions in combination with a program already recorded in a computer system.

A part or all of the video coding apparatus 11 and the video decoding apparatus 31 in the embodiment described above may be realized as an integrated circuit such as a Large Scale Integration (LSI). Each function block of the video coding apparatus 11 and the video decoding apparatus 31 may be individually realized as processors, or part or all may be integrated into processors. The circuit integration technique is not limited to LSI, and may be realized as dedicated circuits or a multi-purpose processor. In a case that, with advances in semiconductor technology, a circuit integration technology with which an LSI is replaced appears, an integrated circuit based on the technology may be used.

The embodiment of the present invention has been described in detail above referring to the drawings, but the specific configuration is not limited to the above embodiment and various amendments can be made to a design that fall within the scope that does not depart from the gist of the present invention.

INDUSTRIAL APPLICABILITY

The embodiment of the present invention can be preferably applied to a video decoding apparatus that decodes coded data in which image data is coded, and a video coding apparatus that generates coded data in which image data is coded. The embodiment of the present invention can be preferably applied to a data structure of coded data generated by the video coding apparatus and referred to by the video decoding apparatus.

CROSS-REFERENCE TO RELATED APPLICATION

The present application claims priority of JP 2021-091071, filed on May 31, 2021, and all the contents thereof are included herein by the reference.

REFERENCE SIGNS LIST

31 Image decoding apparatus
301 Entropy decoder
302 Parameter decoder
303 Inter-prediction parameter derivation unit
30377 GPM prediction unit
305, 107 Loop filter
306, 109 Reference picture memory
307, 108 Prediction parameter memory
308, 101 Prediction image generation unit
309 Inter-prediction image generation unit
30952 GPM combining unit
311, 105 Inverse quantization and inverse transform processing unit
312, 106 Addition unit
11 Image coding apparatus
102 Subtraction unit
103 Transform and quantization unit
104 Entropy coder
110 Coding parameter determination unit
111 Parameter coder
112 Inter-prediction parameter coder
120 Prediction parameter derivation unit

The invention claimed is:

1. A video decoding apparatus comprising:
   a prediction unit configured to derive a prediction image in a GPM mode using a weight parameter derived from an angle variable; and
   a non-separable transform processing unit configured to perform a non-separable transform,
   wherein, in a case that an inter-prediction mode is the GPM mode, the non-separable transform processing unit derives a matrix of a non-separable transform from split information (merge_gpm_partition_idx) of the GPM.

2. The video decoding apparatus according to claim 1, wherein, in a case that the inter-prediction mode is the GPM mode, the non-separable transform processing unit derives a set number (lfnstTrSetId) of the non-separable transform from split information angleIdx of the GPM.

3. The video decoding apparatus according to claim 1, further comprising:
   a TU decoder,
   wherein the TU decoder decodes a first flag lfnst_idx from coded data in a case that the prediction mode is an inter-prediction mode.

4. The video decoding apparatus according to claim 3, wherein the TU decoder has a different value that can be taken for the first flag lfnst_idx in a case that the prediction mode is an intra-prediction mode and in a case that the prediction mode is not the intra-prediction mode.

5. The video decoding apparatus according to claim 4, wherein the TU decoder has a different value of a context index for the first flag lfnst_idx in a case that the prediction mode is the intra-prediction mode and in a case that the prediction mode is not the intra-prediction mode.

6. A video coding apparatus comprising:
   a prediction unit configured to derive a prediction image in a GPM mode using a weight parameter derived from an angle variable; and
   a non-separable transform processing unit configured to perform a non-separable transform,
   wherein, in a case that an inter-prediction mode is the GPM mode, the non-separable transform processing unit derives a matrix of a non-separable transform from split information (merge_gpm_partition_idx) of the GPM.

7. The video coding apparatus according to claim 6, wherein, in a case that the inter-prediction mode is the GPM mode, the non-separable transform processing unit derives a set number (lfnstTrSetId) of the non-separable transform from split information angleIdx of the GPM.

* * * * *